US008774100B2

(12) United States Patent
Xiaoben et al.

(10) Patent No.: US 8,774,100 B2
(45) Date of Patent: Jul. 8, 2014

(54) RESOURCE MANAGEMENT TECHNIQUES FOR WIRELESS NETWORKS

(75) Inventors: He Xiaoben, Espoo (FI); Klaus Doppler, Espoo (FI); Juha Salokannel, Tampere (FI); Carl Simon Wijting, Helsinki (FI); Antti Sorri, Helsinki (FI); Harald Kaaja, Järvenpää (FI)

(73) Assignee: Nokia Corporation, Espoo (FI)

( * ) Notice: Subject to any disclaimer, the term of this patent is extended or adjusted under 35 U.S.C. 154(b) by 1073 days.

(21) Appl. No.: 11/855,657

(22) Filed: Sep. 14, 2007

(65) Prior Publication Data
US 2008/0165727 A1 Jul. 10, 2008

Related U.S. Application Data

(60) Provisional application No. 60/826,082, filed on Sep. 18, 2006.

(51) Int. Cl.
*H04W 72/08* (2009.01)
*H04J 3/16* (2006.01)
*H04W 16/06* (2009.01)
*H04W 16/04* (2009.01)
*H04W 72/04* (2009.01)

(52) U.S. Cl.
CPC .............. *H04W 16/06* (2013.01); *H04W 16/04* (2013.01); *H04W 72/0426* (2013.01)
USPC ......... 370/329; 370/437; 455/452.1; 455/513

(58) Field of Classification Search
CPC ... H04W 16/04; H04W 16/06; H04W 72/085; H04W 72/0426; H04L 5/006
USPC .............. 370/229–236.1, 241, 252–255, 329, 370/332, 336, 342, 345, 431, 437, 441, 370/448–450, 463–465, 480, 523; 455/69, 455/405, 450, 452.1, 452.2, 453, 522, 513
See application file for complete search history.

(56) References Cited

U.S. PATENT DOCUMENTS 6,445,917 B1 * 9/2002 Bark et al. ..................... 455/423
7,099,682 B2 * 8/2006 Ben-Eli .......................... 455/513
(Continued)

FOREIGN PATENT DOCUMENTS

EP 1531586 A2 5/2005
WO 9715163 A1 4/1997
(Continued)

OTHER PUBLICATIONS

Xiaoben, H., "Self-Organized and Distributed Radio Resource Management Scheme for CSMA/CA based IEEE 802.11 WLAN", International Conference on Wireless Communications, Networking and Mobile Computing, 2007. WiCom 2007 (Online) http://ieeexplore.ieee.org/ie15/4339774/4339775/0434, (Sep. 25, 2007), pp. 2048-2053.

(Continued)

*Primary Examiner* — Habte Mered
(74) *Attorney, Agent, or Firm* — Squire Sanders (US) LLP

(57) ABSTRACT

Various embodiments are described relating to resource management techniques for wireless networks. For example, a resource deficiency may be determined for a requesting wireless node in a wireless network. A resource request may be sent from the requesting node to one or more other wireless nodes, and a resource reply including a resource status may be received from one or more of the other wireless nodes in response to the resource request. One of the other nodes from which to obtain a resource may be selected based on the resource status for the selected node, and a resource update message may be sent from the requesting wireless node to the selected wireless node to facilitate a reallocation of resources from the selected node to the requesting node, the resource update message indicating an amount of resources to be reallocated from the selected node to the requesting node.

22 Claims, 16 Drawing Sheets

(56) References Cited

U.S. PATENT DOCUMENTS

| | | | |
|---|---|---|---|
| 7,269,422 B2 * | 9/2007 | Gunnarsson et al. | 455/442 |
| 7,400,901 B2 * | 7/2008 | Kostic et al. | 455/525 |
| 7,620,063 B2 * | 11/2009 | Cave et al. | 370/445 |
| 8,135,395 B2 * | 3/2012 | Cassett et al. | 455/423 |
| 2004/0023660 A1 | 2/2004 | Ben-Eli | |
| 2004/0190478 A1 * | 9/2004 | Backes et al. | 370/338 |
| 2004/0229621 A1 * | 11/2004 | Misra | 455/445 |
| 2005/0143084 A1 | 6/2005 | Cheng et al. | |
| 2005/0243765 A1 * | 11/2005 | Schrader et al. | 370/328 |
| 2006/0182067 A1 * | 8/2006 | Rinne et al. | 370/335 |
| 2006/0256756 A1 * | 11/2006 | Wakabayashi | 370/335 |
| 2007/0189298 A1 * | 8/2007 | Wong et al. | 370/395.1 |
| 2007/0263654 A1 | 11/2007 | Solokannel et al. | |
| 2008/0132233 A1 * | 6/2008 | Li et al. | 455/436 |
| 2008/0214200 A1 * | 9/2008 | Grandblaise et al. | 455/452.2 |
| 2008/0260000 A1 * | 10/2008 | Periyalwar et al. | 375/133 |
| 2009/0274193 A1 * | 11/2009 | Kizu et al. | 375/133 |

FOREIGN PATENT DOCUMENTS

| | | | |
|---|---|---|---|
| WO | 9812837 A1 | 3/1998 | |
| WO | WO 00/70897 | * 11/2000 | H04Q 7/34 |
| WO | 0207473 A1 | 1/2002 | |
| WO | 2006095256 A2 | 9/2006 | |
| WO | 2008035161 A2 | 3/2008 | |

OTHER PUBLICATIONS

International Search Report and Written Opinion for PCT/IB2007/002681 dated May 14, 2008.

Zhu, Jing et al., "Adaptive CSMA for Scalable Network Capacity in High-Density WLAN: a Hardware Prototyping Approach", INFOCOM'06, (Apr. 2006), 10 pgs.

Haiyun, Luo et al., "Self-learning Collision Avoidance for Wireless Networks", INFOCOM'06, (Apr. 2006), 12 pgs.

Search Report dated Jan. 23, 2013 for corresponding European Patent Application No. 07 82 5122.

* cited by examiner

RESOURCE MANAGEMENT TECHNIQUES FOR WIRELESS NETWORKS

CROSS-REFERENCE TO RELATED APPLICATION

This application claims priority to U.S. Provisional Application Ser. No. 60/826,082, filed on Sep. 18, 2006, entitled "Resource Management Techniques for Wireless Networks," hereby incorporated by reference.

BACKGROUND

As wireless technology has advanced, a variety of wireless networks have been installed, such as cellular, wireless LAN (local area network) or WLAN, and other wireless networks. Some wireless networks are based upon the Institute of Electrical and Electronics Engineers (IEEE) 802.11 family of Wireless LAN (WLAN) industry specifications, or other IEEE specifications, for example. Other wireless networks are based on cellular technologies, such as Global System For Mobile Communications (GSM), for example. Some networks are being developed based on other standards or technologies, such as WiMedia ultra-wideband (UWB) common radio platform to augment the convergence platform with TCP/IP services. A number of working groups are working to improve on these various technologies. These are merely a few examples of wireless networks, and a number of other wireless networks and technologies exist or are being developed.

Wireless networks often suffer from resource management problems. Network resources are frequently used inefficiently. For example, in some instances, some links may be congested, while other links may be idle. Some nodes in the network may be occupying a resource for long periods of time, while other nodes may be resource starved or may have been waiting long periods of time without being served. Some Access Points (APs) or Base Stations (BSs) may be extremely busy or congested, while other APs may be idle or have unused resources. Traffic congestion, unbalanced resource usage and unfairness are common problems for wireless networks.

Many networks employ a centralized resource management, where a centralized entity may collect information from each of the other network entities (e.g., APs or BSs), and then make resource allocation decisions for the different entities in the network(s). As networks grow or increase in number of entities within the network, a centralized resource management solution may have a number of disadvantages, such as creating a significant amount of signaling overhead and increasing complexity.

SUMMARY

Various embodiments are described relating to resource management techniques for wireless networks.

According to an example embodiment, a method is provided. The method may include, for example determining a resource status for a wireless node in a wireless network, making a determination that the node is resource poor based on the determining, and sending a complain report to one or more other wireless nodes indicating the resource status of the sending node.

In another example embodiment, a method is provided. The method may include determining, for a measuring wireless node, a performance-related parameter for one or more neighbor wireless nodes or associated wireless nodes, determining a resource score for the measuring wireless node based on the determined performance related parameters, comparing the resource score of the measuring node to resource scores of one or more other wireless nodes, making a determination that the measuring node is resource-rich relative to one or more other wireless nodes based on the comparing, and releasing a resource or reducing usage of a resource in response to the determination.

In an example embodiment, a method is provided. The method may include determining a first resource score for a measuring wireless node, determining that one or more wireless nodes are resource-poor (e.g., such as the measuring node or other node), transmitting the first resource score to one or more other wireless nodes, receiving a second resource score from one or more other wireless nodes, and releasing, by the measuring wireless node, a resource or reducing usage of a resource if the measuring node is resource-rich relative to one or more other wireless nodes.

In another example embodiment, a method is provided. The method may include determining a resource deficiency for a requesting wireless node in a wireless network, sending a resource request from the requesting node to one or more other wireless nodes, receiving a resource reply including a resource status from one or more of the other wireless nodes in response to the resource request, and selecting one of the other nodes from which to obtain a resource based on the resource status for the selected node. The method may further include sending a resource update message from the requesting wireless node to the selected wireless node to facilitate a reallocation of resources from the selected node to the requesting node. The resource update message may indicate an amount of resources to be reallocated from the selected node to the requesting node.

In yet another example embodiment, a method may be provided. The method may include determining, at a requesting node, that a transmit buffer level exceeds a threshold, and sending a resource request from the requesting node to one or more other wireless nodes. The method may also include receiving a resource reply including a resource status from one or more of the other wireless nodes in response to the resource request. In an example embodiment, the resource status may include a transmit buffer level and a power mask of the replying node, where the power mask may indicate a transmission power level used by the replying node for one or more channels or time slots. The method may further include selecting one of the other nodes from which to obtain a resource based on the resource status for the selected node, and sending a resource update message to the selected node. The resource update message may include an updated power mask for use by the selected wireless node to cause the selected node to reduce transmission power, e.g., on one or more channels or time slots.

In another example embodiment, an apparatus may be provided that includes a controller, a memory coupled to the controller, and a wireless transceiver coupled to the controller. The apparatus may be adapted to: determine a resource status for a wireless node in a wireless network, make a determination that the node is resource poor based on the determining, and send a complain report to one or more other wireless nodes indicating the resource status of the sending node.

In another example embodiment, an apparatus may be provided that includes a controller, a memory coupled to the controller, and a wireless transceiver coupled to the controller. The apparatus may be adapted to: determine a resource deficiency for a requesting wireless node in a wireless network, send a resource request from the requesting node to one or more other wireless nodes, receive a resource reply including a resource status from one or more of the other wireless nodes in response to the resource request; select one of the other nodes from which to obtain a resource based on the resource status for the selected node, and send a resource update message from the requesting wireless node to the selected wireless node to facilitate a reallocation of resources from the selected node to the requesting node, the resource update message indicating an amount of resources to be reallocated from the selected node to the requesting node.

DETAILED DESCRIPTION

Figure 1:
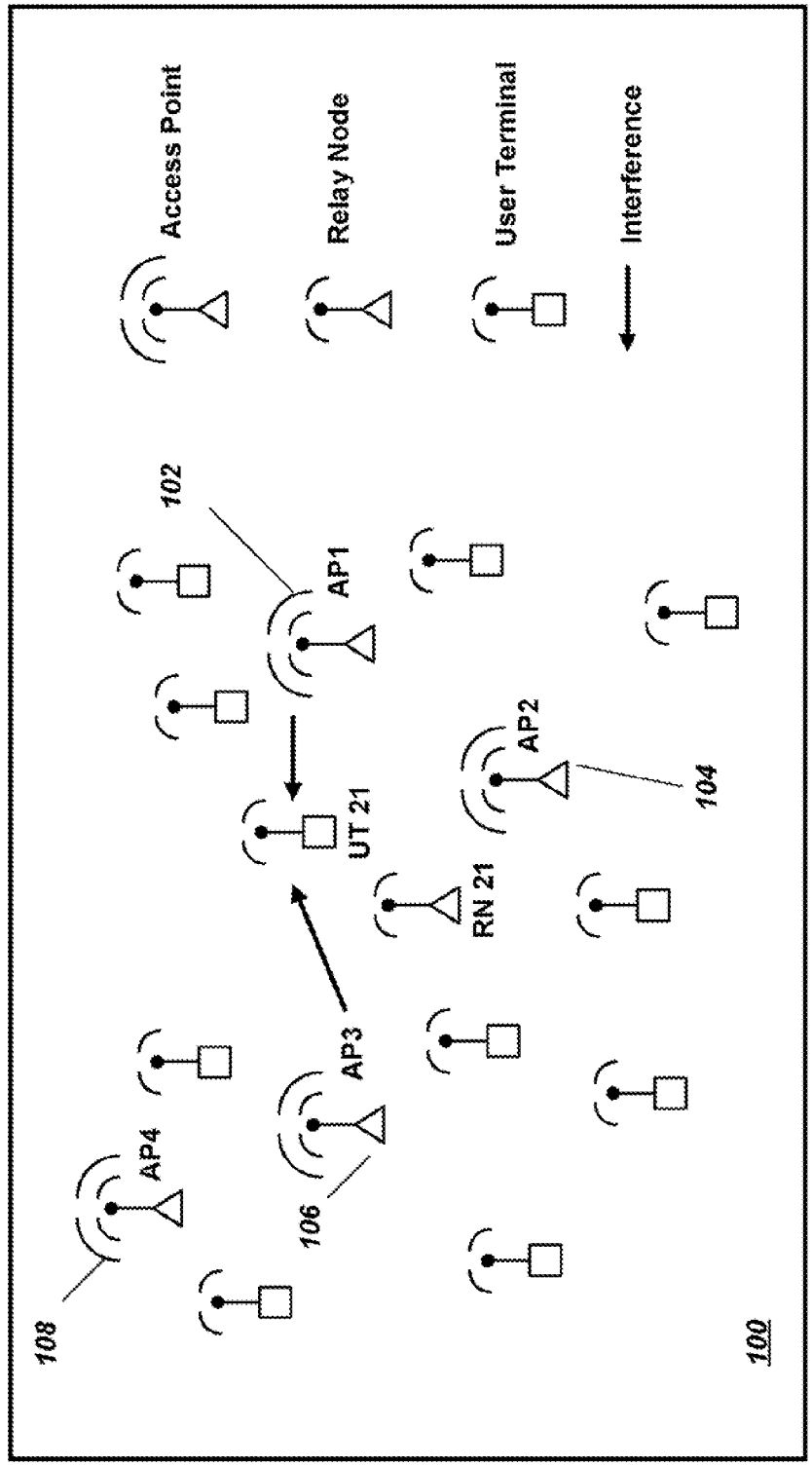
FIG. 1 is a block diagram illustrating a wireless system according to an example embodiment.

A wireless network or system may include a group of distributed entities, such as Access Points (APs), Relay Nodes (RNs), and User Terminals (UTs) or stations, for example. The wireless network may be any type of wireless network. In an example embodiment, each (or one or more) entity may be self managing or self-organizing, which may include, for example, monitoring, measuring, analyzing and adjusting itself with respect to use of network resources. In some cases, each entity may coordinate resource utilization, as necessary, with other entities, and this coordination may, in some cases, occur without a centralized resource management entity. This distributed coordination mechanism may be used with entities of different categories (but are not limited to), such as: 1) Radio Access Point (RAP); 2) Relay Node (RN); 3) Mobile Station (MS) or user terminal (UT); 4) Router; or 5) Gateway (GW), for example.

According to an example embodiment, an entity (such as a station or user terminal or UT, AP, BS, RN, etc.) may measure one or more performance-related parameters (such as received signal strength of received signals, level of fullness for transmit buffers, packet error rate, etc.). The measured performance-related parameters may be compared to one or more thresholds to determine the entity's resource status such as, for example, resource-rich, resource-neutral, or resource-poor.

For example, a user terminal receiving signals having a received signal strength less than a first threshold may be classified as resource-poor, and therefore, may have difficulty accessing the wireless media and/or transmitting packets to one or more APs, for example. An entity having received signals with a received signal strength greater than a second threshold may, for example, be classified as resource-rich, for example. An entity that has been classified as resource-poor, for example, may send or broadcast a complain report (or resource request) to one or more other wireless nodes, e.g., to request one or more resource-rich nodes to release network resources or reduce usage of resources, thereby allowing other entities, such as the resource-poor entity, to obtain greater resources.

An entity (such as an AP, BS, RN, etc.) may also determine a resource score for itself based on one or more measurement of performance-related parameters or information received from other wireless nodes. The resource score may, for example, indicate a resource utilization status for a cell or the entity. These resource scores may also be classified, for example, as either resource-rich, resource-neutral, or resource-poor, based on one or more thresholds, for example. For example, a BS or AP or RN may determine a received signal strength for signals from one or more UTs or nodes that are associated with the BS/AP/RN, for example. The measuring entity may then generate or determine its resource score based on the received signal strength of the received signals, for example. Other parameters may be used to generate a resource score.

In an example embodiment, the measuring entity (BS/AP/RN, etc.) may then send or broadcast its resource score to one or more other nodes, e.g., if its resource score indicates that it is resource-poor, or if a complain report has been received indicating that another entity is resource-poor. For example, an entity may broadcast its resource score to other nodes by broadcasting the resource score on a Beacon or Beacon slot. The entity may also receive resource scores from other nodes (e.g., via Beacon transmissions from other nodes), and then may compare its resource score to the resource scores of other nodes. If the entity is resource-rich relative to one or more (or even all) of the other reporting wireless nodes (e.g., based on the reported resource scores), the relative resource-rich entity may then pro-actively release a resource or reduce usage of a resource.

Similarly, other network entities or wireless nodes that have determined and transmitted their resource scores, may compare their resource scores to the resource scores of other entities, and may release resources, for example, if they have the highest (or one of the highest) resource scores, or a resource score indicating they are the richest or one of the resource-richest entities, as compared to other reporting entities.

As a result of relatively resource-rich entities or nodes pro-actively releasing resources, other (e.g., poorer) entities may have opportunities to obtain greater resources. Releasing a resource or reducing usage of a resource may include one or more of reducing transmission power, adjusting a smart antenna or transmission beam (e.g., as part of beam forming), restricting or limiting itself from using a resource, such as restricting or avoiding use of a channel or one or more specific time slots, or reassigning itself to use a different (e.g., less busy) channel.

By comparison of self-evaluation results to certain (or programmable) thresholds, the resource level of each entity may classified, e.g., as resource-poor, resource-rich, or resource-neutral. According to an example embodiment, resource-poor entities may include a privilege to trigger or transmit a resource request (or complain report); the resource-rich entities may have a responsibility to release resources or adjust resource utilization; and other entities may be resource-neutral and free from resource coordination. According to an example embodiment, a resource-rich entity may proactively release (or adjust) its resource usage based on its self-evaluation results. Explicit signaling or coordination may not be used in such cases, as an example. In other cases, signaling may be used.

A number of wireless networks, such as WLAN and others, may be limited by interference, at least in some cases. Interference mitigation among different Access Points may be useful to improve WLAN performance in some cases. Some networks, such as WLAN, may be designed as isolated networks. In addition, WLAN networks are typically isolated networks, and the coordination and scheduling among different Access Points can be very difficult or even impossible in some cases, as these Access Points may be owned by different parties. Therefore, a self-organized and distributed radio resource management for wireless LAN or other wireless networks may be desirable.

FIG. 1 is a block diagram illustrating a wireless system 100 according to an example embodiment. In FIG. 1, a group of distributed entities are shown. As illustrated in FIG. 1, three independent local area access points 102, 104, 106, 108 may be operating within each other's communication range. In this example, AP2 104 may suffer interference both from AP1 102 and AP3 106. Each of the entities (e.g., APs, RNs, UTs) in this example system may perform self-measurement (or self-evaluation), comparison, and pro-active resource release (e.g., for relatively resource-rich entities). For example, one or more (or even all) of the APs 102, 104, 106, 108 may perform self-evaluation of their resource utilization. For example, AP1 102 may identify itself as resource-rich, AP2 104 may identify itself as resource-poor, while AP3 106 and AP4 108 may identify themselves as resource-neutral. After that, AP1 102 may decide to adjust its radio resource usages pro-actively. Therefore, AP2 104 may gain the radio resource and improve its resource status. AP3 106 and AP4 108 may not need to do anything further concerning this, except for periodic self-evaluation. Therefore, according to an example embodiment, in some example distributed and self-organized radio resource management techniques, some types of explicit negotiation signaling may be unnecessary, and actions from AP3 106 and AP4 108 may be avoided, as a result, and system performance may be improved. In some example embodiments, resource scores or other information may be exchanged via Beacons or other messages or signaling. In other example embodiments, additional signaling may be provided to communicate between nodes or entities.

A further example will now be described. This example is merely illustrative and many other implementations or embodiments may be provided. According to an example embodiment, a User Terminal1 (UT1) may have determined its channel access rate is very poor (e.g., this may be caused by staying too far away from its own Access Point, or caused by the Co-Channel Interference from neighboring Access Points). This UT1 may generate a "Complain Report" (CR), and broadcast to its neighborhood through a dedicated "busy tone channel", or other message.

The CR may be received by various network entities (e.g., APs, RNs), such as APk or Relay Nodek (RNk). (k=1, 2, ..., n). The APk/RNk may then evaluate its own resource utilization status, and determine its resource score, e.g. 85%. In an example embodiment, the resource score may be calculated according to the channel access rate for this APk/RNk. The higher the score, the richer the APk/RNk may be considered to be, according to an example embodiment.

It may be assumed, for example, that all the AP/RN, who received the CR, may be able to hear each other (or receive each other's transmitted signals). This APk/RNk may form a synchronized Beacon Group, in which they put their own resource score one by one in a list. Alternatively, the AP/RN may initiate resource measurement, and if a resource-poor situation is determined within the serving area, they may trigger the Beacon process, in which nodes may perform self-evaluation and report their resource scores to other nodes via Beacon transmissions. In an example embodiment, each entity may transmit its resource score in a Beacon slot or other message.

If an entity (e.g., AP/RN) determines that all of the entities have provided their resource score, the entity may determine whether it is resource-rich (e.g., highest or one of the highest) resource score as compared to the other entities or nodes reporting resource scores. If the entity determines that it has the highest or one of the highest resource scores, it may then perform pro-active resource release or reduce resource usage, for example.

Other APs/RNs may similarly determine whether they are resource-rich compared to the other reporting APs/RNs, and may similarly release resources if their score is highest or one of the highest (e.g., relatively resource rich compared to one or more other nodes).

According to an example embodiment, an AP/RN (or other node/entity) that decides to take pro-active actions to release/adjust its resource usage may select (e.g., randomly select) one (or more) of the following example techniques:

1) Reduce its transmission power by 10%; or;
2) Adjust its smart antenna to make beam-forming (e.g., provide a narrower beam, broader beam or other beam adjustment);
3) Restrict itself from using the channel, time slots or chunks; or
4) Reassign itself a different channel, if applicable.

This technique may be repeated, so that further resources may be released.

Figure 2:
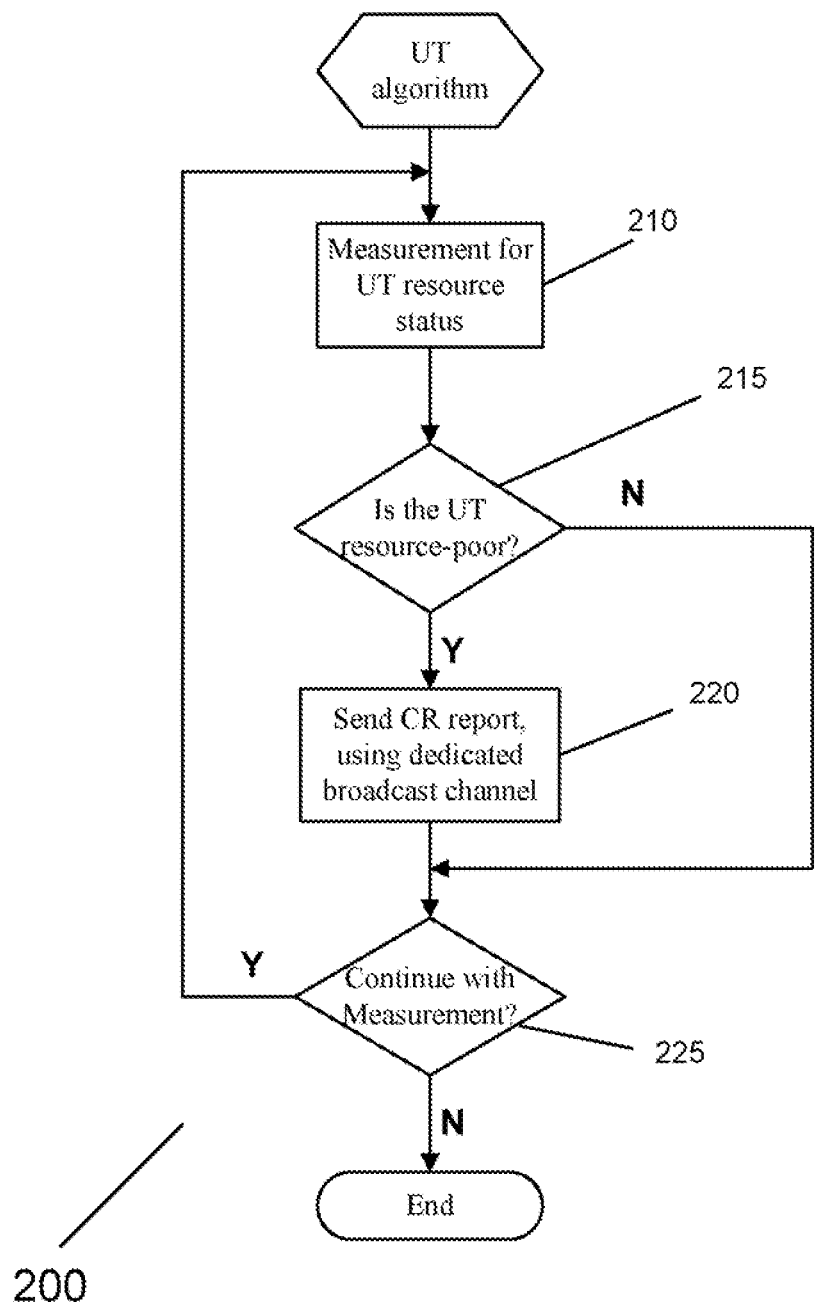
FIG. 2 is a flow chart 200 of an operation of wireless node, such as a user terminal, according to an example embodiment.
Figure 3:
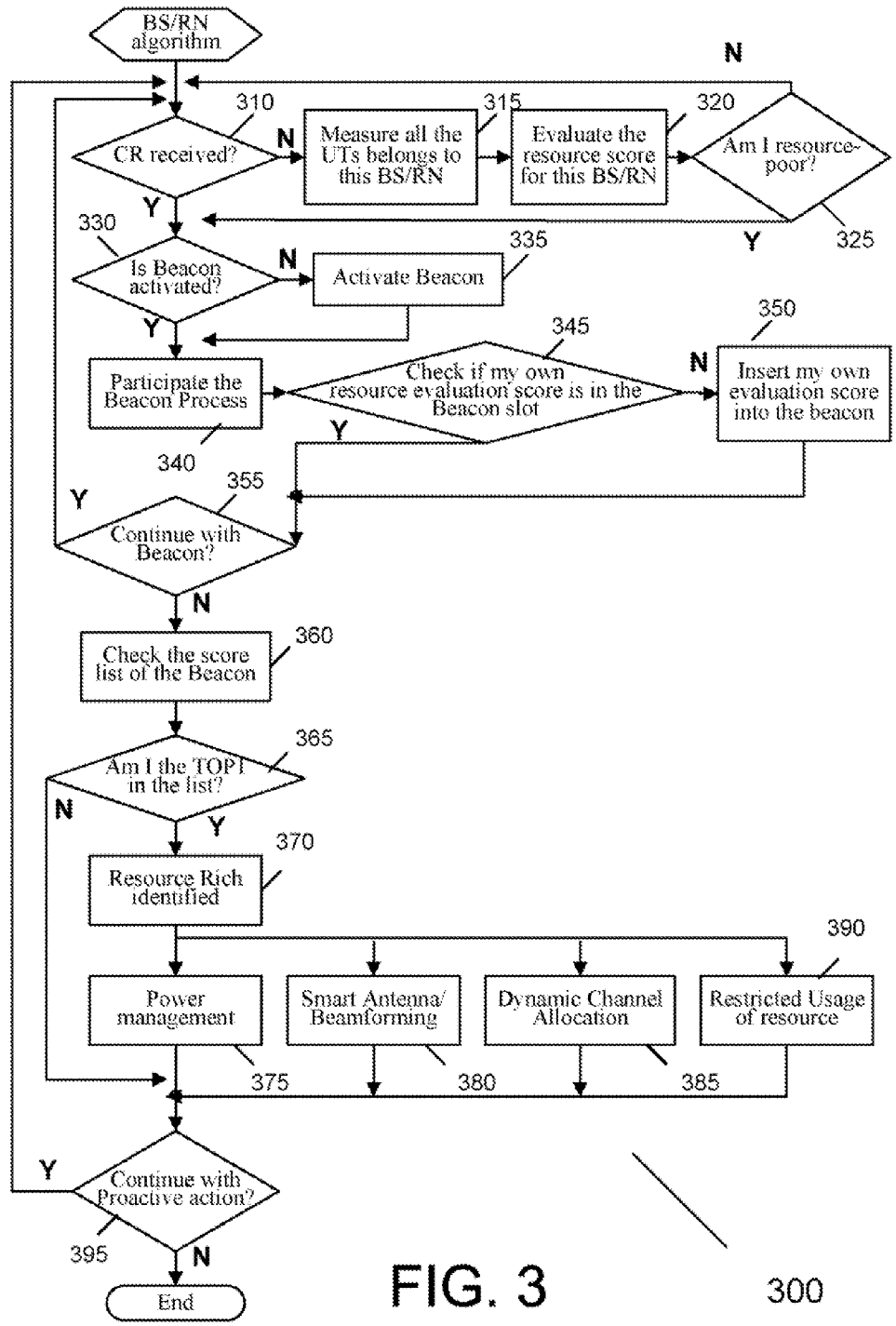
FIG. 3 is a flow chart 300 illustrating operation of a wireless node or entity according to an example embodiment.

According to an example embodiment, there may be at least two different techniques included in this example system:

1) Self-evaluation and triggering technique (e.g., sending a complain report) performed by a UT (or wireless station), for example. An example embodiment is illustrated in FIG. 2.
2) Distributed coordination technique at BS/RN side to determine resource rich entity (entities) and release resources. An example embodiment is illustrated in FIG. 3. These techniques are further described below.

FIG. 2 is a flow chart 200 of an operation of a user terminal according to an example embodiment. As discussed previously, the UT (or other entity) may determine whether it is suffering from performance degradation, and therefore it may trigger the process, e.g., by transmitting a Complain Report (CR) to other nodes/entities.

Referring to FIG. 2, at 210, a user terminal (UT) or wireless station may determine its resource status, e.g., by measuring or determining or one more performance-related parameters. There are a number of different measurements that may be performed to determine the UT's resource status. For example, the UT may determine a received signal strength of signals received from one or more other wireless nodes or entities, such as its associated RN/AP/BS. The UT may determine a packet error rate for packets it has transmitted or attempted to transmit. The UT may determine a level of fullness of one or more of its transmit buffers, or determine a number of packets pending or waiting in its transmit buffers for transmission, or may determine the delay or average delay period for packets in a transmit buffer before transmission, or may measure another type of performance-related parameter.

At 215, the UT may determine whether it is resource-poor or not. For example, the UT may compare the measured performance-related parameter to one or more thresholds. For example, a received signal strength for received signals that is less than a threshold, a level of fullness of a transmit buffer that is greater than a threshold, a number of packets in a transmit buffer that greater than a threshold, or a packet error rate greater than a threshold may indicate the UT is resource poor. These are merely a few examples, and many other types of measurements may be performed and compared to thresholds to allow a node or UT to perform a self-evaluation and determine its resource status, e.g., whether it may be resource-poor or not.

If the UT is not resource-poor, the flow proceeds to block 225, where the UT may continue monitoring or measuring its performance-related parameters, returning the flow to block 210.

If at block 215, the UT determines that it is resource-poor, the flow proceeds to block 220 where the UT may send a complain report (or a resource request) to one or more other wireless nodes or entities, e.g., as a broadcast message, or as a message sent on a dedicated channel, or other message. The complain report (CR) may indicate the resource status of the complaining UT, such that the UT is resource-poor, and may indicate how resource-poor the UT is, such as by including a value indicating the UT's received signal strength, level of fullness of transmit buffers, etc., or other value, such as a resource score.

FIG. 3 is a flow chart 300 illustrating operation of a network entity (e.g., RN/AP/BS) to allow a resource-rich entity to be identified and then release network resources according to an example embodiment. At 310, the entity determines whether a complain report has been received. If not, at block 315, the entity may measure one or more performance-related parameters for one or more other nodes, such as neighbor nodes, or nodes that are associated with the BS/AP/RN. This may include measuring received signal strength from each of the associated nodes or entities for the measuring entity, for example. The entity may then generate or determine a resource score, based on the measured parameters. Because the measuring entity may measure parameters with respect to the nodes or UTs that are associated with the measuring entity (for example), the resource score for the entity (e.g., RN/BS/AP) may in some cases, for example, reflect an overall resource usage or resource availability of the cell for the measuring entity (e.g., RN/BS/AP), e.g., taking into account information (e.g., measurements) or feedback from one or more other nodes or entities in the cell.

At 325, the entity may compare its resource score to determine if its resource score is less than a first threshold. If its score is less than a first threshold, the entity may classify itself as resource-poor, for example. From time to time, the measuring entity (e.g., RN/BS/AP) may measure performance-related parameters and may update its resource score. Flow may proceed to block 330 if the entity is classified as resource-poor. (In an alternative embodiment, the entity may also send a CR to other nodes if it determines that it is resource-poor, which will trigger other nodes or entities to similarly measure and report their resource scores, for example).

The thresholds used to be used to determine whether a node or entity is resource-poor or resource-rich may be standard values, or may be, from time to time, communicated or distributed via messages or Beacons to the various entities, such that the entities or nodes may have the same (or similar) definitions for what may be resource-poor, resource-rich, etc.

If at 310, a complain report from another node or entity has been received, then flow proceeds to 330. Thus, according to an example embodiment, if a node or entity is resource-poor (e.g., either this measuring entity via block 325, or another entity via receipt of a CR at block 310), then the flow may proceed to block 330, where one or more entities may communicate their resource scores to the other entities (e.g., via Beacon transmissions or other messages), and then compare their resource score to other resource scores to determine which of the nodes or entities are the most (or one of the most) resource-rich, for example.

At 330, if the Beacon for the entity has not been activated, it may be activated at 335, and may participate in the Beacon process at 340, where the entity may transmit its resource score in its Beacon, e.g., in a Beacon slot. At 355, the entity may check to determine that its resource score is transmitted in a Beacon slot, and if not, will insert its resource score into its Beacon slot at 350.

Similarly, other nodes or entities (e.g., RN/BS/AP) may also determine and transmit their resource scores in their Beacons, e.g., in response to receipt of a CR.

At 360, the entity may receive resource scores from Beacon transmissions from other nodes or entities. At 365, the entity may compare its resource score to the resource scores of other entities to determine if it is richer than one or more other entities, or if it is one of the richest, or, in some cases, if it is the most resource-rich compared to the other entities, based on the resource scores, for example. If at 370, the entity determines that it is resource-rich compared to one or more other entities, the entity may pro-actively release a resource or reduce its usage of a resource, which may be shown at blocks 375, 380, 385, and 390, as examples. By releasing or reducing usage of a resource, this may allow other (e.g., poorer) entities to have an opportunity to increase or gain resources, for example.

At 375, an entity may reduce its transmission power, e.g., by 10% or some other percentage. At 380, the entity may adjust its smart antenna, or adjust its antenna beam, as part of beam forming, for example. This may include providing a narrower beam or a broader beam, or aiming an antenna beam away from one or more nodes, or directing an antenna beam at one or more other nodes or entities, for example. At 385, the entity may restrict or limit itself from using one or more resources, such as not using one or more channels or frequencies or time slots for transmissions, which may free up these resources and make them more available to other entities. At 390, the entity may reassign itself to a different channel or frequency for transmissions, which may provide other (poorer) entities greater access to the current channel.

After a pro-active release or reduction of usage of a resource, the flow may proceed to block 395, where it may proceed back to block 310 if evaluation and resource management/action is to continue.

Therefore, according to an example embodiment, an example technique for distributed resource management in a wireless system may include:
1) Self-evaluation of resource utilization, e.g., including monitoring, measurement, analysis and evaluating.
2) Self-decision making and distributed coordination, e.g., including Decision making and Action (release or adjustment of resource)
3) Self-triggering, e.g., process may be triggered by a CR from a node or entity, and/or when a node or entity finds that it is resource-poor, for example.

With regard to self-evaluation of resource utilization, each node in the network may independently evaluate the resource utilization situation of itself and/or the neighboring area, for example:
1) if the node itself has been occupying the resource for a long period of time;
2) if the node itself has been waiting for the resource for a long period of time;
3) if someone else in the neighboring area has been occupying the resource for a long period of time;
4) If someone else in the neighboring area has been waiting for the resource for a long period of time.

According to an example embodiment, there may be different combinations of possible evaluation results, which may correspond with different actions. The following knowledge/decision table is an example of actions that may be performed related to resource management based on various combinations:

| situation | Resource category | Action needed |
| --- | --- | --- |
| 1) | Rich (moderately) | Release or adjustment moderately |
| 2) | Poor | Request (e.g., CR) |
| 1) + 4) | Very rich | Release or usage adjustment aggressively |
| 2) + 3) | Very poor | Greedy request (e.g., CR or Resource Request indicating Greedy or urgent request for resources) |

According to an example embodiment, Game Theory may be applied to formulate the decision-making process.

A "resource drifting" phenomena may occur. For example, Rich A entity may give some resource to Poor B, then Poor B may give to more Poor C. After some time passes, the resource may be given back to entity A. In order to avoid such occurrences (e.g., instability), one or more of the following example techniques may be used:
1) A hop counter may be used for resource relocation. The initiator of the resource relocation may set the initial value of the counter, and each time the resource is relocated, the counter may be decreased by one. When the counter reaches zero, the current owner of the resource may stop the resource relocation.
2) Alternatively, directed resource relocation may be specified, in which the initiator may specify to whom the resource may be given.

According to an example embodiment, nodes or entities within the system or network will typically not have global information and make a globally optimized decision regarding resource management. Therefore, for example, each node may make a decision on resource management by itself, which may be based upon measurements or signals received from other nodes, for example (such as a CR, or received signal strength measurements and the like). According to an example embodiment, distributed decision-making processes may be coordinated, such as by one of the following schemes:
1) Contention-based mechanism: Each node may contend for the resource based of the self-evaluation results. For example, those that are resource-poor may contend using higher access category or QoS parameters, which may increase the likelihood of successfully contending for or obtaining the wireless media, for example. Those that are resource-rich may contend using lower priority access category or QoS parameters, or may defer altogether from contending to provide poorer entities an increased opportunity to gain the resource.
2) Token-Ring mechanism: The token-ring mechanism may resemble a reservation book circulating among all the entities, by which the resource status and requests may be communicated.
3) Resource Request signaling mechanism: The resource request may be done through explicit signaling conversation.
4) Self-triggering: There may be, for example, two types of triggering schemes:
a) Resource-Rich entity initiated, where a rich entity may send a message indicating that it is rich, or broadcast its resource score, etc., e.g., via Beacon transmission, for example. This may cause other entities to perform self-evaluation and transmit or broadcast their resource scores, to allow one or more of the richest entities to release resources.
b) Resource-Poor entity initiated, such as where a self-evaluation by an entity indicates that the entity is resource-poor. The resource-poor entity may then transmit a complain report, for example, which may indicate a resource score or otherwise indicate how poor the entity is, e.g., since there may be other entities that are poorer, for example. For example, an entity may have determined that it is resource-poor, and may actually be one of the resource richer entities relative to other entities.

Figure 4:
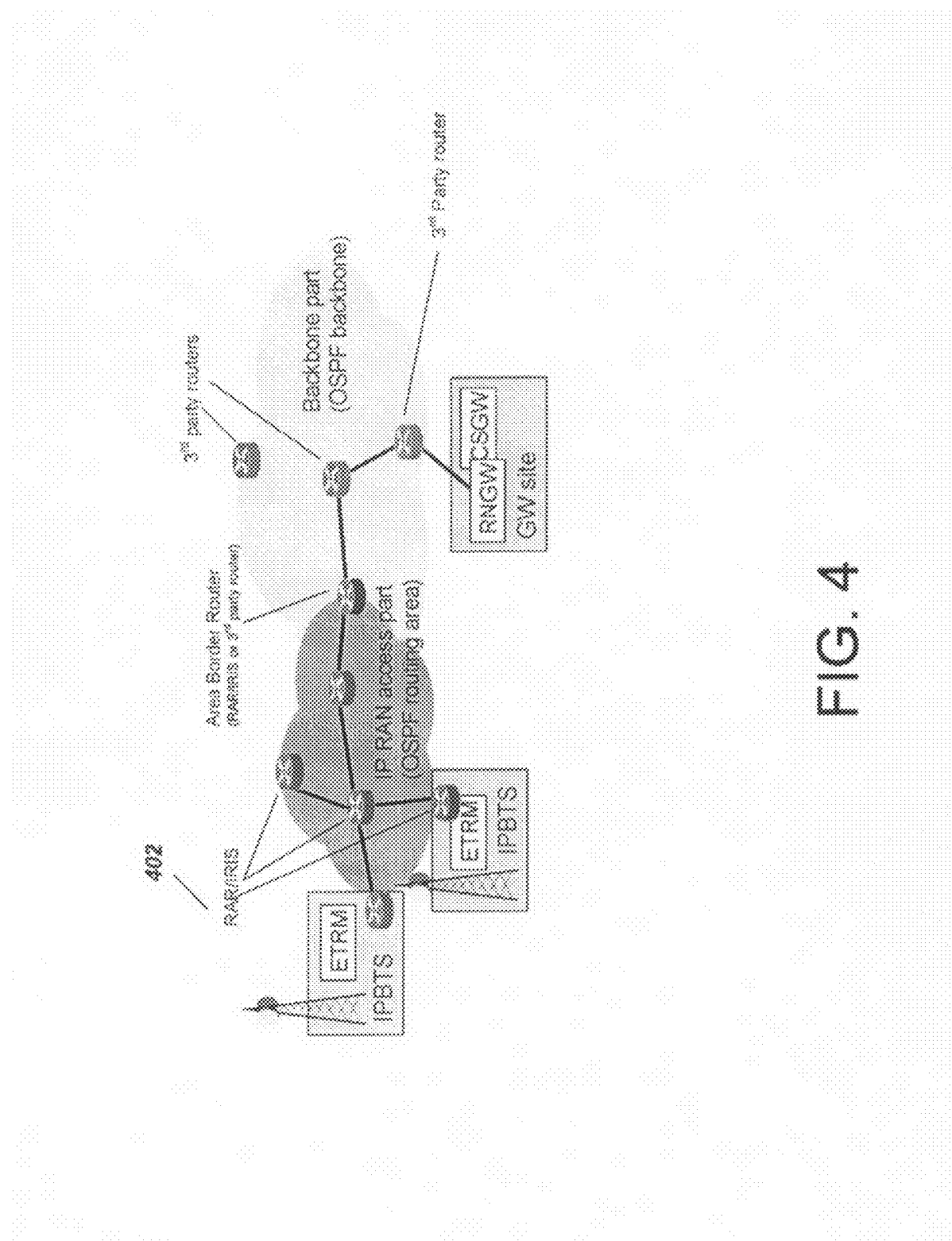
FIG. 4 is a diagram of a network according to an example embodiment.

According to an example embodiment, in an IP-enabled Radio Access Network, such as illustrated in FIG. 4, a Radio Access Router (RAR) 402 may monitor its own queue, buffer, routing table, etc. or other performance-related parameter to decide its own resource utilization status. Further, RAR 402 may receive or listen to each other node's routing message to obtain more knowledge of the network resource utilization status. Based on this information, the RAR 402 or other nodes may already know themselves if they belong to the "resource-rich" or "resource-poor" category. They may negotiate an optimal resource allocation plan, by using signaling messages, for example, requesting other richer (or richer) nodes to release resources.

In another example embodiment, Intra-System Flexible Spectrum Usage (FSU) may be used. For example, an entity or device may enter a network, where there may not be sufficient spectrum or bandwidth for the new entity entering the network. A beacon may be used to negotiate with other existing entities in the network. For example, the new entity entering the network may transmit a message, e.g., via Beacon slot, indicating a resource request or complain report (CR), indicating that the new entity has no network resources (e.g., resource score of Zero). Other nodes or entities in the network may then perform self-evaluation and transmit their resource scores, and one or more of the resource richest entities may release resources (e.g., bandwidth or spectrum), so that the new entity may obtain the requested bandwidth or channel. For example, the rich entity may send a message to the new entity indicating the channel or frequency or time slot that has been released, for example. The rich node may alternatively confirm that a resource has been released via its Beacon transmission, and may even identify in its beacon the resource (e.g., channel or time slot) that has been released).

In another example embodiment, Inter-System Spectrum Sharing may be used. For example, a foreign device may enter a network, without enough spectrum. There may be a Contention based negotiation, e.g., contention based access. A rich node may proactively release the spectrum, or defer from contending for the medium, if applicable. The foreign device may obtain the spectrum by periodically checking, after some time, without necessarily knowing that the resource has been released.

Further example embodiments are described below.

Figure 5:
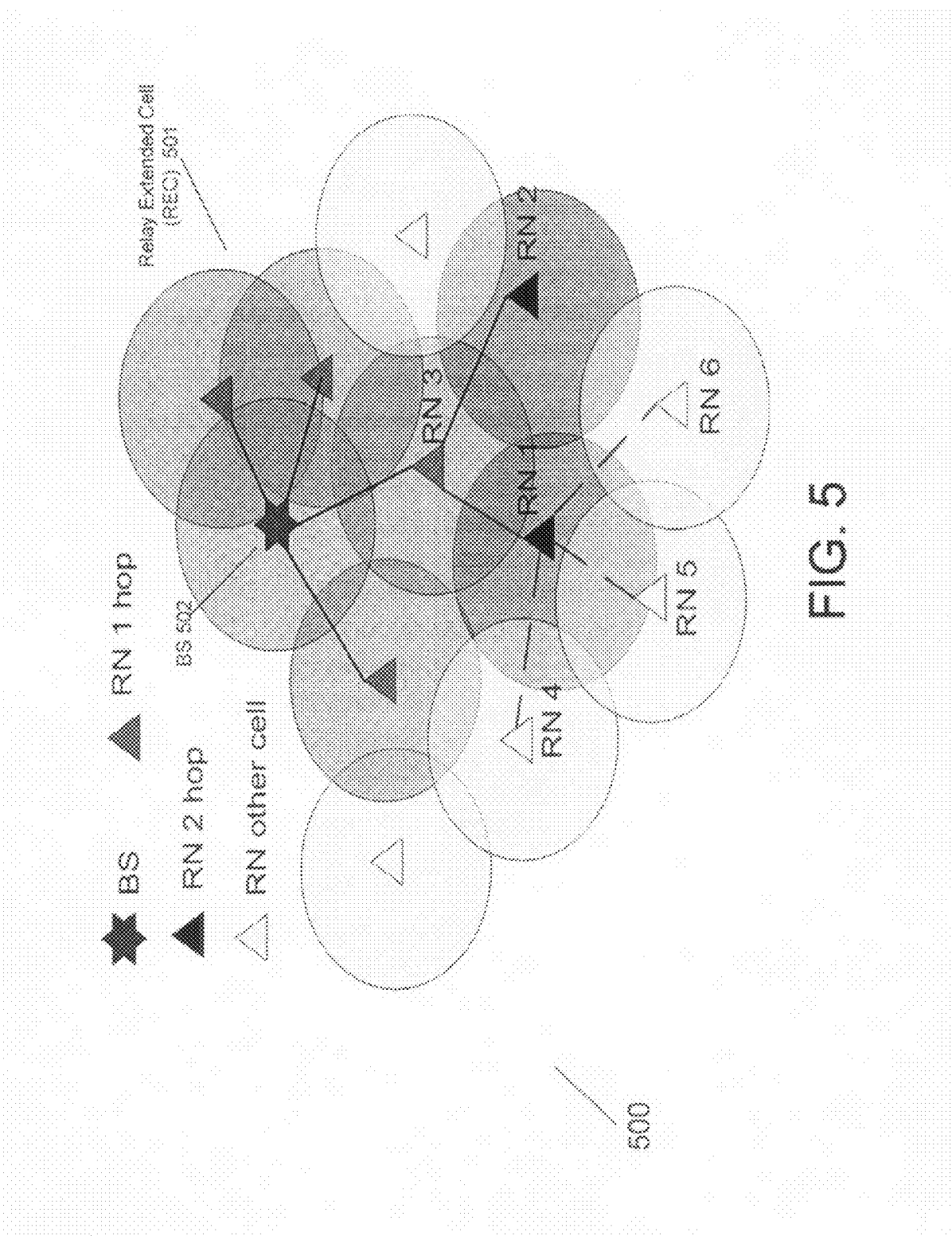
FIG. 5 is a diagram illustrating a wireless network according to another example embodiment.

FIG. 5 is a diagram illustrating a wireless network according to an example embodiment. In an example embodiment, a relay extended or relay-enhanced cell (REC) may be provided, which may include a BS (base station) (or AP), and one or more RNs (relay nodes) coupled wirelessly to the BS. The REC, via the RNs, may, for example, provide service to a larger number of subscribers (UTs, or stations), or may provide extended coverage via the one or more RNs. For example, referring to FIG. 5, a REC 501 is shown, an may include a BS 502, and a number of RNs, such as RN1, RN2, RN3, etc. RN4, RN5, and RN6 may be associated with other cells, in this example.

In this scenario the RNs may have similar power and coverage area as the BS 502. In addition, UTs may be coupled to an associated BS via one or more hops, such as two hops (BS-RN-UT), and three (BS-RN-RN-UT) or more hops. This scenario can involve many RNs with different coverage areas. Therefore, in an example embodiment, a fixed frequency reuse between cells, where the resources in the cell are divided between the BS and the RNs may not make efficient use of the available radio resources. Even soft-frequency reuse with a single power mask for the whole cell, where the high power resources are then split between the RNs, may not make efficient use of the available radio resources.

FIG. 5 illustrates RN 1 with its neighbors. RN 3 belongs to the same relay enhanced cell (REC 501) and RN 4, RN 5 and RN 6 belong to neighboring cells. RN 3 may be one-hop from BS 502, while RN 1 and RN 2 are two-hops from BS 502. The solid line (between RN 1 and RN 3) indicates a connection of RN 1 with a neighboring RN (RN 3) that is within the cell 502 and over which regular communication may be taking place. The dashed lines may, for example, indicate connections between RNs of cell 502 to RNs (RN 4, RN 5, and RN 6) of other cells, although regular communication may not necessarily be taking place taking place between Rn 1 and RNs 4-6. In this example, RN 2 may or may not be considered as a neighbor because the overlapping coverage area, in some cases may be considered is too small. RN 1 may have a list of its neighbors, which may include RN 2, RN 3, RN 4, RN 5, RN 6, etc., or some subset of these RNs, for example.

Figure 6:
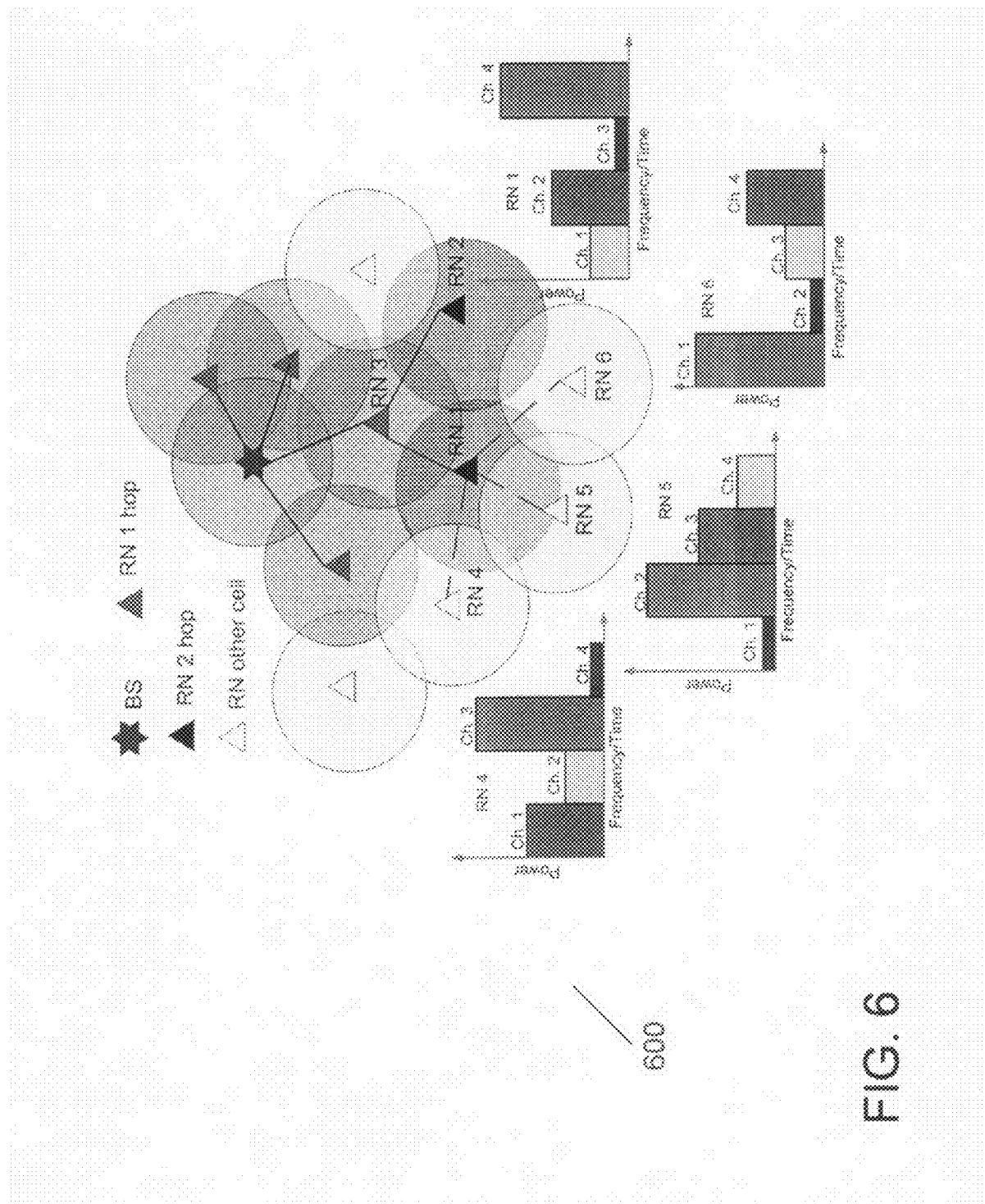
FIG. 6 is a diagram of the network of FIG. 5 and showing assigned power masks for some network entities.

FIG. 6 is a diagram of the network of FIG. 5 and showing assigned power masks for some network entities according to an example embodiment. FIG. 6 illustrates RN 1 and its neighbors with the assigned power masks. The power masks shown in FIG. 6 may be, for example, an initial power masks assigned to various entities, such as RN 1, RN4, RN 5 and RN 6. Although not shown, RN 2 and RN 3 may also have an assigned power mask and could also be illustrated.

According to an example embodiment, a power mask may indicate a transmission power level for a network entity or node, such as a transmission power level for one or more channels or time slots. Thus, the power mask for each entity shown in FIG. 6 plots power (Y axis) versus frequency/time (X-axis). Frequency/time are shown in the X axis since the assigned transmission power may be assigned for a specific frequency (frequency band) or channel, or a specific time slot, or a combination, as examples. The assigned transmission power is shown graphically for each RN in FIG. 6, for channels 1, 2, 3 and 4, as an example. As shown in the example of FIG. 6, the assigned power level for each entity (RN 1, RN4, RN 5 and RN 6) may be different for each RN. For example, RN 6 is assigned a relatively high power for channel 1, while RN 1, RN 4 and RN 5 have been assigned less, but differing, amounts of power for channel 1. The power masks may allow for soft frequency reuse, by providing different transmission powers for entities or nodes having overlapping coverage, for example.

The initial power mask may be obtained by nodes using a variety of different techniques. For example, the power mask may be set by a network planning tool or it may be determined by other techniques, e.g. the network learns its topology and sets the power masks accordingly. The APs, RNs and other entities may operate within their assigned power mask, according to an example embodiment.

Figure 7:
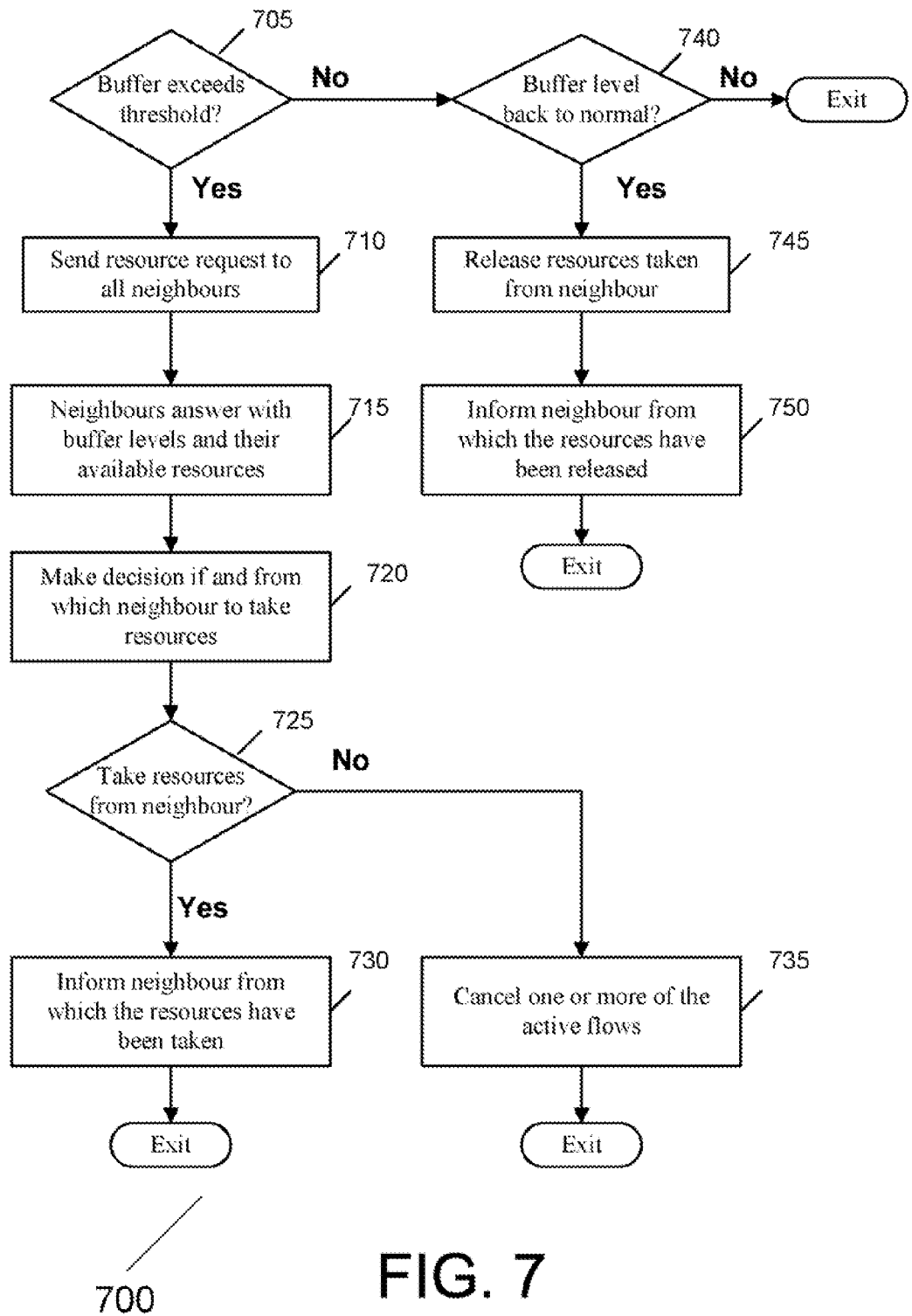
FIG. 7 is a flow chart illustrating operation of one or more wireless nodes shown in FIGS. 5 and 6 according to an example embodiment.

FIG. 7 is a flow chart illustrating operation of one or more wireless nodes shown in FIGS. 5 and 6 according to an example embodiment.

According to an example embodiment an operation of RN 1 will now be described with reference to the flow chart of FIG. 7. RN 1, or other entity, may determine whether it has a resource deficiency, or determine whether it is resource-poor, for example. If an RN determines that it is resource-poor, or a resource deficiency exists, then the entity may send a resource request to other nodes. Other nodes may, for example, send a resource reply to the requesting node, including a resource status of the replying node. The requesting node may then select one of the nodes, e.g., the richest node or one of the richest nodes, from which it may want to obtain resources. The requesting entity (RN 1 in this example) may send a resource update message to the selected (or rich) node, indicating an amount of resources to be released or loaned to the requesting node. Further details and variations are described below with reference to FIG. 7.

RN 1 may determine if it is resource-poor or has resource deficiency, for example, by monitoring its transmission buffer level. There may be two pre-defined thresholds that may be used in this example:

1) A max_threshold—if exceeded triggers a resource request (e.g., resource-poor).
2) A normal_threshold—below which the operation is normal (e.g., resource-rich). If an RN or other entity has a transmit buffer level between the normal_threshold and the max_threshold, this may indicate that the RN is neither resource-poor nor resource-rich, but may be considered resource-neutral for example.

According to an example embodiment, the difference between the thresholds may be selected such that the resource requests occur at a limited frequency, e.g., every second or less, for example. These values may be selected to avoid an unstable situation where excessive resource requests are generated, for example.

Referring to FIG. 7, at 705, RN 1 may determine whether its buffer level exceeds max_threshold. If not, at 740, RN 1 may determine whether its buffer level is less than the normal_threshold. If its buffer level is not less than the normal_threshold, then this may indicate that RN 1 is resource-neutral, and no further action may be taken (e.g., exit). However, if the buffer level for RN 1 is less than the normal_threshold at 740, the flow proceeds to 745.

At 745, the entity (RN 1) releases resources obtained (or borrowed) from its neighbor, since RN 1 is no longer resource poor (or deficient), but may now be considered to be resource-rich. According to an example embodiment, transmission power may be a resource that may be reallocated between nodes or entities, although any type of resource may be released or obtained. Therefore, releasing resources by RN 1 at 745 may involve, for example, decreasing a transmission power, e.g., for one or more channels, time slots, etc.

At 750, a message, such as a resource update message, may be sent by RN 1 to the node or entity from which it may have previously borrowed transmission power or other resource.

Alternatively, if, at 705, the buffer level of RN 1 exceeds the max_threshold, then at 710, RN 1 may send a resource request message to its neighbors, such as RN 3, 4, 5 and 6 (this may be same as or similar to a complain report, for example). At 715, RN 3, 4, 5 and 6 may answer to this message with a resource status message, e.g., indicating their buffer level and their available resources, such as their current power mask. Their power mask may indicate, for example, current transmission power levels for one or more channels or time slots.

At 720, RN 1 may receive the resource replies from the other nodes or entities, and may make a decision on whether to take or obtain resources from a neighbor, including determining which neighbor. In an example embodiment, RN 1 may check the buffer levels from the other RNs and determine whether it takes high power resources from one of the other RNs. It may base the decision on the following criteria, as an example:

Take only resources from nodes where the buffer level is below the normal threshold for normal operation.

Take the resources from the node that has the lowest buffer level and for which the highest power gain (difference of new high power level and currently used power level) may be achieved. According to an example embodiment, the resources may be taken from the node with the highest U:

$$U = a^*(normal\_threshold - buffer\_level) + b^*power\_difference$$

For example, the buffer_level may indicate a level of fullness of a transmit buffer of the replying node, power_difference may indicate the difference in transmission power levels between the replying node (RN 6) and the requesting node (e.g., RN 1), and a and b may be variable weighting factors. These variable weighting factors may be set to 0.5, for example, or any other value.

With respect to FIG. 6, it may be seen that RN 6 has the highest transmission power level for channel 1. Therefore, in this example, RN 1 may decide to obtain power resources from RN 6, as an example. Therefore, RN 6 may be the selected node.

Referring to the flow chart of FIG. 7, at 730, after deciding to take resources from another entity (such as RN 6), RN 1 may then signal to the selected node (e.g., RN 6) from which it has decided to obtain the resources that it should use now a lower power level (e.g., by providing a power mask). This new power level that the selected node (RN 6) should use may be, for example, the power level that RN 1 was using previously. RN 6 may acknowledge the resource update.

Figure 8:
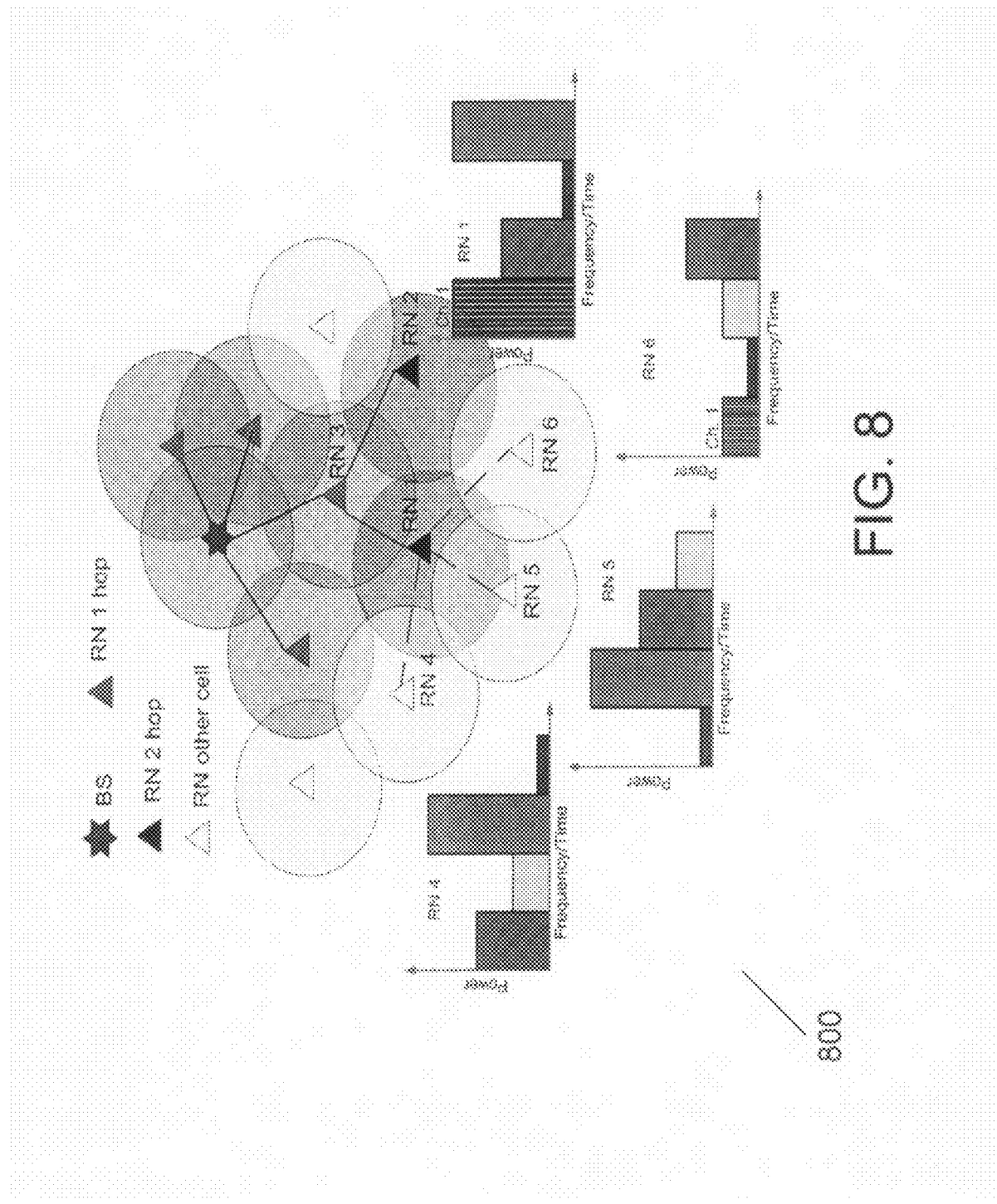
FIG. 8 is a diagram that illustrates use of a new or updated power mask according to an example embodiment.

FIG. 8 is a diagram that illustrates a new or updated power mask to be used by RN 6 and RN 1, according to an example embodiment. In this case RN 1 decides to use the high power level of RN 6 in the first resource block (e.g., channel 1 or time slot 1). After signaling the updated power mask to RN 6, RN 1 is using the highest power level and RN 6 is using the power level that RN 1 was using in the first resource block, according to this example embodiment. The striped power levels for RN 1 and RN 6 show the updated power levels for the first resource block or channel 1, for example.

In another example embodiment, resources may be obtained from an entity that may have primarily delay-insensitive traffic in its transmit buffers, such as background traffic. Therefore, the resource status may be provided by a replying node for one or more classes of service or QOS levels. Therefore, if a node has primarily background or other delay-insensitive traffic in its buffers, the requesting node may still select such node, even though it may not have buffer levels that are below the normal_threshold, for example.

According to an example embodiment, if at 725, no resource can or should be taken from the neighboring nodes (e.g., if no nodes are below normal_threshold, or no nodes are both below normal_threshold and have a relatively high transmission power level), RN 1 may take some other action to reduce the traffic load, such as by, e.g., at 735 dropping one of the active flows it is serving. For example, RN 1 drops the flow, which has the lowest average throughput per transmission resource and/or the lowest recent throughput per high power transmission resource (e.g. in the last X seconds, or last 5 seconds). In this manner, the requesting node may drop or cancel one or more marginal or problematic flows. The node may, for example, cancel a flow having the lowest V, where V may be determined as:

$$V = a^*avg\_throuput\_per\_resource + b^*recent\_throughput\_per\_resource$$

If the buffer level drops below the normal operation threshold RN 1 may return to the initial power mask. It may signal its return to all the RNs from which it has taken power resources and they may update their power mask to the initial values for these resources.

Figure 9:
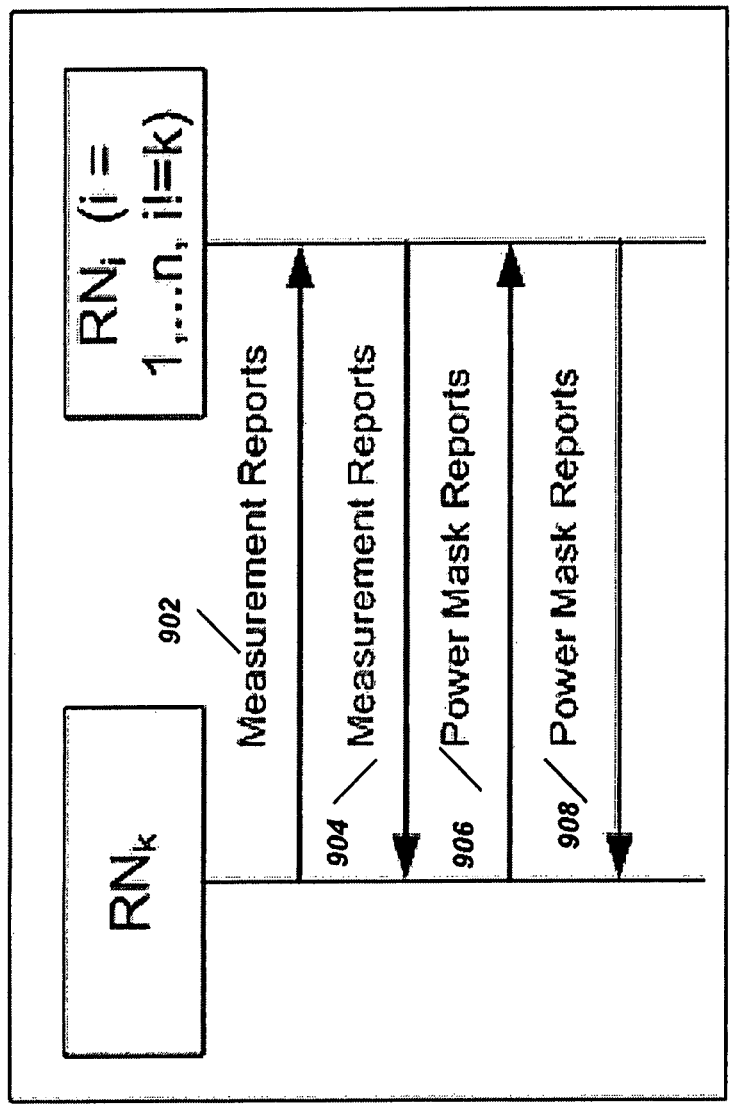
FIG. 9 is a diagram illustrating exchange of resource status between wireless nodes according to an example embodiment.

FIG. 9 is a diagram illustrating exchange of resource status between wireless nodes according to an example embodiment. Wireless nodes or entities may periodically exchange resource status. This exchange of resource status may be triggered in response to a complain report or resource request. Alternatively, nodes or entities may periodically exchange resource status, e.g., via their Beacon transmissions or other messages (e.g., broadcast messages), without being triggered by a CR or resource request. The exchange of resource status may include, for example, measurement reports 902, 904 (e.g., indicating their transmit buffer levels), and power mask reports 906, 908 (e.g., indicating power transmission levels).

Figure 10:
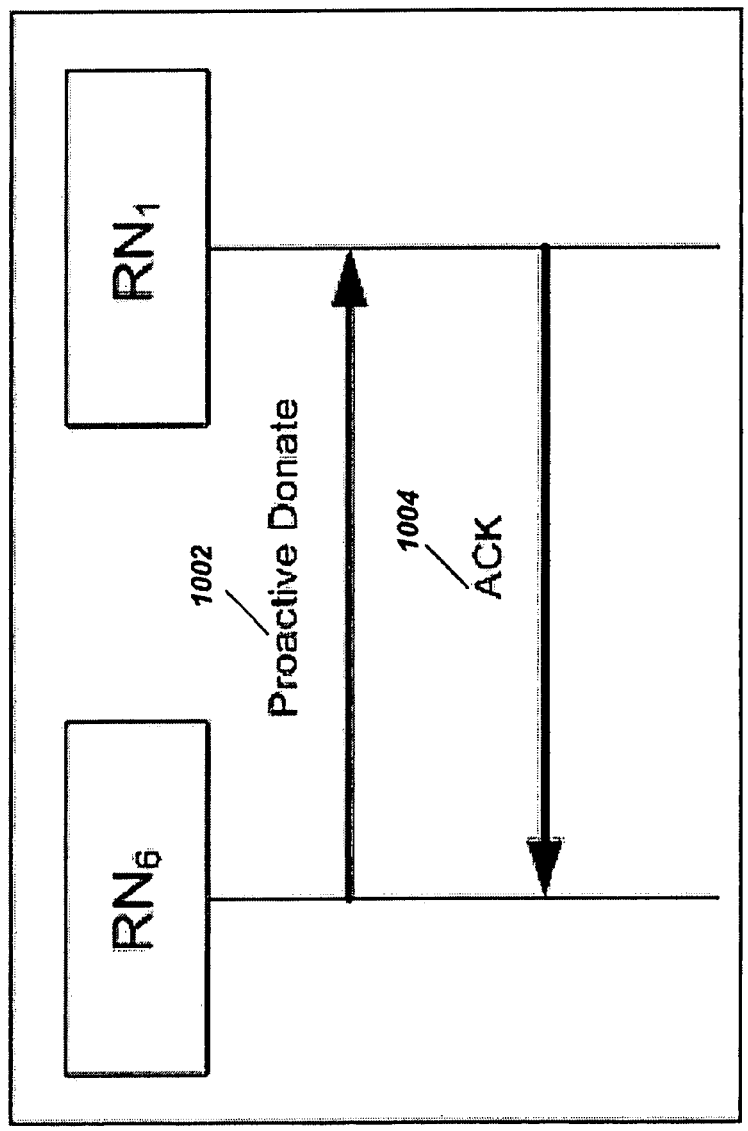
FIG. 10 is a diagram illustrating communication between nodes regarding proactive donation of resources according to an example embodiment.

FIG. 10 is a diagram illustrating communication between nodes regarding proactive donation of resources according to an example embodiment. Based on the resource status received from other wireless nodes, one or more nodes, such as RN 6, may determine that they are resource-rich compared to other poor nodes. The resource rich node(s), such as RN 6 in this example, therefore, may proactively donate resources (e.g., decrease transmission power level) based on the resource status from other nodes. This proactive donation may be made in response to a CR or resource request, e.g., or in response to a specific power mask (or resource update message) from a poor node requesting specific donation of resources to a specific node (e.g., RN 1). As shown in FIG. 10, the rich node, RN 6, may send a message 1002 to RN 1 confirming that it has proactively donated the requested resources, and RN 1 may send an acknowledgement 1004.

Alternatively, a rich node, such as RN 6, may proactively donate a resource (e.g., decrease transmission power level) without receiving a CR or resource request. In such case, the rich node (RN 6) may send a broadcast, beacon message or other message to one or more (or even all) nodes indicating that it has donated the resource or decreased its transmission power (e.g., on one or more channels or time slots). This donation may be communicated as an updated power mask transmitted on the nodes Beacon slot. This resource donation by a rich node may be performed generally based on the existence of one or more poor nodes (e.g., without necessarily being triggered by a CR or resource request). The one or more poor nodes, or the resource-poorest node, who know who they are, may then take or obtain the resource by increasing their transmission power, and then broadcasting their updated power mask indicating an increase in transmission power level.

There are a number of different options or alternatives that may be provided or implemented. For example, instead of only using the buffer levels as a threshold, additionally an increasing buffer level can trigger the resource request. For example, a rapidly increasing transmit buffer level may allow a node to anticipate a problem, and send out a resource request, even though the buffer level has not yet exceeded the max_threshold. For example, if no new flow is served by the RN and the buffer level is increasing by more than x % over several consecutive resource allocation periods, then the available transmission resources are not sufficient and the RN sends a resource request message.

According to an example embodiment, the techniques discussed herein may be integrated with QoS mechanisms. Each RN may include different transmit buffers for K QoS classes and use different thresholds for each QoS class to trigger the resource request. The resource status message may then include the buffer levels for one or more (or even) all buffers. In this example, RN 3, 4, 5 and 6 may answer then with the buffer levels for each of the K QoS queues. RN 1 may take resources from the node with the highest u:

$$u = \sum_{K} a_k * (\text{normal\_threshold}_k - \text{buffer\_level}_k) + b * \text{power\_difference}$$

wherein k denotes the QoS class. According to an example embodiment, RN 1 may not take resources from a RN where the buffer levels are above the normal threshold for selected QoS classes, except, for example, if the buffer level of the background traffic class is above the threshold, the resources can be taken.

In addition, when dropping an active flow also, the QoS class may be considered in the decision regarding which flow to drop. Lower priority flows may be dropped before higher priority traffic, for example.

In an example embodiment, RN 1 may, for example, wait for the acknowledgement or confirmation of RN 6 (e.g., that resources have been released) before it uses or takes the resources from RN 6. Alternatively RN 1 may use the high power resources immediately after signaling the power mask update to RN 6.

A variety of different communication mechanisms may be used, as well as different messages. For example, the mechanism for exchanging messages with neighbors may depend on whether a direct communication between the neighbors is possible. Further it may depend on whether the neighbor is part of the same relay enhanced cell or whether it belongs to a neighboring relay enhanced cell. According to an example embodiment, in a case wherein the neighbor belongs to the same cell:

If direct communication is possible, it may communicate directly

If direct communication is not possible, it may communicate through the BS of the relay enhanced cell or use the shortest route using RNs of the same relay enhanced cell According to an example embodiment, in a case wherein the neighbor belongs to a neighboring cell:

If direct communication is possible, it may communicate directly

If direct communication is not possible, it may communicate through the BSs of the two relay enhanced cells or use the shortest route using RNs of different relay enhanced cells In the illustrative examples above, RNs may be involved in requesting resources and providing resources. However, similar techniques may be applied to any network entities or wireless nodes, such as BS, AP, RN, UT, etc.

According to an example embodiment, UTs or other wireless nodes may measure SINR (signal to interference and noise ratio), and may report dominant interferers and their relative signal strength compared to the serving relay node (RN) or base station (BS). Further, the current Packet Error rate (PER) is available to the serving RN or BS. Frequency adaptive users or nodes may measure SINR and provide this as feedback for their subchannels. This may allow other nodes, such as a BS or RN to determine what channels where nodes have the least amount of SINR or a low PER. These channels may be assigned to nodes or may be obtained/reallocated to provide a more efficient use of resources. Instead of a hard frequency reuse (e.g., one frequency or channel for each AP), different transmission power levels may be assigned via a power mask to different overlapping entities so that frequencies may be shared or re-used. Hard frequency reuse may be used to improve SINR for nodes at a cell edge. However, a RN or BS may still communicate with nearby nodes or UTs using lower transmit power, e.g., soft frequency reuse. Thus, the interference may be improved for the cell edge nodes or UTs. The number of different power levels may include, for example, max power, max-3 dB, max-6 dB, max-9 dB, etc. The power levels may be allocated using a variety of techniques.

According to an example embodiment, an entity or node (e.g., AP/BS/RN) may determine that it has a resource deficiency or is resource-poor. This may be performed by determining a transmit buffer level that exceeds a threshold, or by comparing one or more other performance related parameters to a threshold, for example. Other techniques may be used. The entity or wireless node may then send (e.g., broadcast) a resource request to one or more other wireless nodes. Each of the other nodes may receive the resource request, and may perform a self-evaluation, e.g., by evaluating their transmit buffer levels, or other performance-related parameter, and may send resource replies to the requesting node.

The requesting node may receive a resource reply from one or more of the other nodes (replying nodes). The resource reply may include a resource status for the replying node, such as an indication that the replying node or entity is resource-rich, resource-neutral, or resource-poor, for example. In another example embodiment, the resource status (included in the resource reply) may include a transmit buffer level and a power mask for the replying node. The power mask may, for example, indicate a transmission power level for each of one or more channels or time slots used by the replying node.

The requesting node may then select one of the other wireless nodes or entities from which to obtain a resource based on the resource status for the nodes. The selecting may include selecting a wireless node having a transmit buffer level that is less than a threshold (such as a normal_threshold) and having a transmission power that is greater than the transmission power of the requesting node. Thus, resources such as transmission power may be obtained from a node that does not have a resource deficiency (e.g., buffer transmission level is below a normal threshold) and has power greater than the requesting node, e.g., that would allow a power gain and has excess power to provide to the requesting node, for example.

In another example embodiment, the selecting one of the other nodes from which to obtain a resource may include selecting a wireless node having a highest U, where U may, for example, be defined as:

$$U = a*(\text{normal\_threshold} - \text{buffer\_level}) + b*\text{power\_difference}.$$

For example, the buffer_level may indicate a relative level of fullness of a transmit buffer of the replying node, the power_difference may indicate the difference in transmission power levels between the replying node and the requesting node, and may be normalized by dividing the power difference by the maximum power level. Also, a and b are variable weighting factors. The buffer_level may be a relative buffer level (or normalized), and may be described as:

$$\text{buffer\_level} = (\text{normal\_threshold} - \text{buffer\_level}) / \text{normal\_threshold}.$$

These various values, such as buffer_level, transmission power levels, and other values, may be encoded as one or more bits, e.g., 3-bits per value, for example.

After selecting one of the other nodes from which to obtain a resource, the requesting node may then send a resource update message to the selected wireless node to facilitate (or request or perform) a reallocation of resources from the selected node to the requesting node. For example, the resource update message may indicate an amount of resources to be reallocated from the selected node to the requesting node. In an example embodiment, the resource update message may indicate a channel or time slot, and an updated power mask, or an updated transmission power level for the indicated channel or time slot. This updated power mask or power transmission level may be less than a previous transmission power level used by the selected node, thereby causing the selected node to decrease its transmission power. The selected node may then send a confirmation message or acknowledgement to the requesting node indicating that the resource has been reallocated or reduced in usage, e.g., transmission power level has been decreased. This decrease in transmission power, e.g., by a specified amount, may allow the requesting node to then increase its transmission power level, e.g., on the identified channel or time slot, thereby reallocating this resource (e.g., transmission power) from the selected node to the requesting node.

The requesting node, at some point, may perform another self-evaluation and determine that it no longer has a resource deficiency, or is less resource deficient than before. For example, the requesting node may determine that it transmit buffer level is less than a normal_threshold, for example. In such case, the requesting node may then return the reallocated resource from the node from which the resource was obtained or borrowed. For example, the requesting node may send a second resource update message to the selected node indicating a new or updated power mask, or an updated transmission power level for one or more channels or time slots, for example. The new power mask may indicate an increased transmission power level for the selected node, thereby returning the borrowed resource (e.g., transmission power in this example) back to the selected node. The requesting node, likewise, may also release the resource, e.g., decrease its transmission power by the amount borrowed.

In another example embodiment, the full resource amount borrowed need not be returned all at once, but may be returned in portions or iterations as need for the resource at the requesting node permits, for example. For example, a portion of the borrowed or reallocated resource may be returned, e.g., a portion of the reallocated power may be released (by decreasing transmission power) and returned (e.g., by sending an updated power mask).

According to another example embodiment, a requesting wireless node or entity (e.g., BS/AP/RN/UT) may determine that its transmission buffer level exceeds a threshold (such as a max_threshold). The requesting node may then send or broadcast a resource request to one or more other wireless nodes. The requesting node may receive a resource reply including a resource status from one or more of the other wireless nodes in response to the resource request. The resource status may, for example, may include a transmit buffer level and a power mask of the replying node. For example, the power mask may indicate a transmission power level used by the replying node for one or more channels or time slots. The requesting node or entity may then select one of the other nodes from which to obtain a resource (such as transmission power, for example), based on the resource status received from the one or more other nodes. The requesting node may then send a resource update message to the selected node. The resource update message may include an updated power mask for use by the selected wireless node to cause the selected node to reduce transmission power on one or more channels or time slots. The requesting node may then obtain the resource, e.g., by increasing its transmission power by approximately an amount that is the same as the decrease in transmission power provided by the selected node, for example.

The requesting node may later return the borrowed resource, or a portion thereof, by sending a further resource update message with a further updated power mask or transmission power levels, indicating that the selected node may increase its transmission power, for example. Transmission power, as described, is merely an example resource, and many other types of resources may be requested or borrowed.

Figure 11:
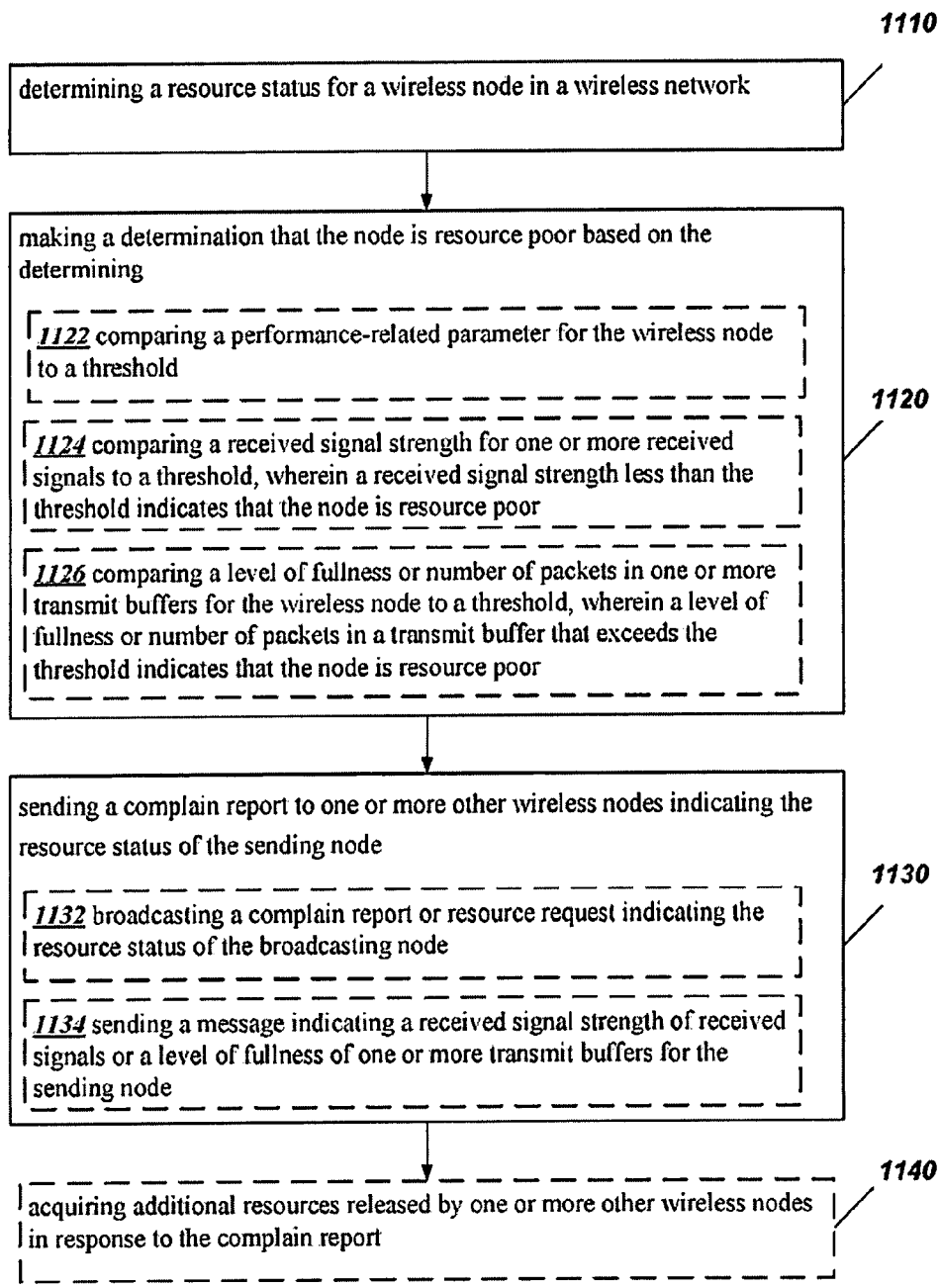
FIG. 11 is a flowchart illustrating operation of a wireless node or entity according to an example embodiment.

FIG. 11 is a flowchart 1100 illustrating operation of a wireless node or entity according to an example embodiment. At 1110, a resource status for a wireless node in a wireless network may be determined. According to an example embodiment, the determining a resource status may include at least one of: determining a received signal strength of signals received from one or more other wireless nodes; determining a packet error rate for packets transmitted by the wireless node; determining a level of fullness of one or more transmit buffers at the wireless node; determining a number of packets in one or more transmit buffers at the wireless node; determining a delay period or average delay period for one or more packets in transmit buffers before the packets are transmitted; or measuring a performance-related parameter for the wireless node.

At 1120, a determination may be made that the node is resource poor based on the determining. According to an example embodiment, making the determination may include comparing a performance-related parameter for the wireless node to a threshold (1122). According to an example embodiment, making the determination may include comparing a received signal strength for one or more received signals to a threshold, wherein a received signal strength less than the threshold indicates that the node is resource poor (1124).

According to an example embodiment, making the determination may include comparing a level of fullness or number of packets in one or more transmit buffers for the wireless node to a threshold, wherein a level of fullness or number of packets in a transmit buffer that exceeds the threshold indicates that the node is resource poor (1126).

At 1130, a complain report may be sent to one or more other wireless nodes indicating the resource status of the sending node. According to an example embodiment, sending the complain report may include broadcasting a complain report or resource request indicating the resource status of the broadcasting node (1132). According to an example embodiment, sending the complain report may include sending a message indicating a received signal strength of received signals or a level of fullness of one or more transmit buffers for the sending node (1134).

According to an example embodiment, additional resources released by one or more other wireless nodes in response to the complain report may be acquired (1140).

Figure 12:
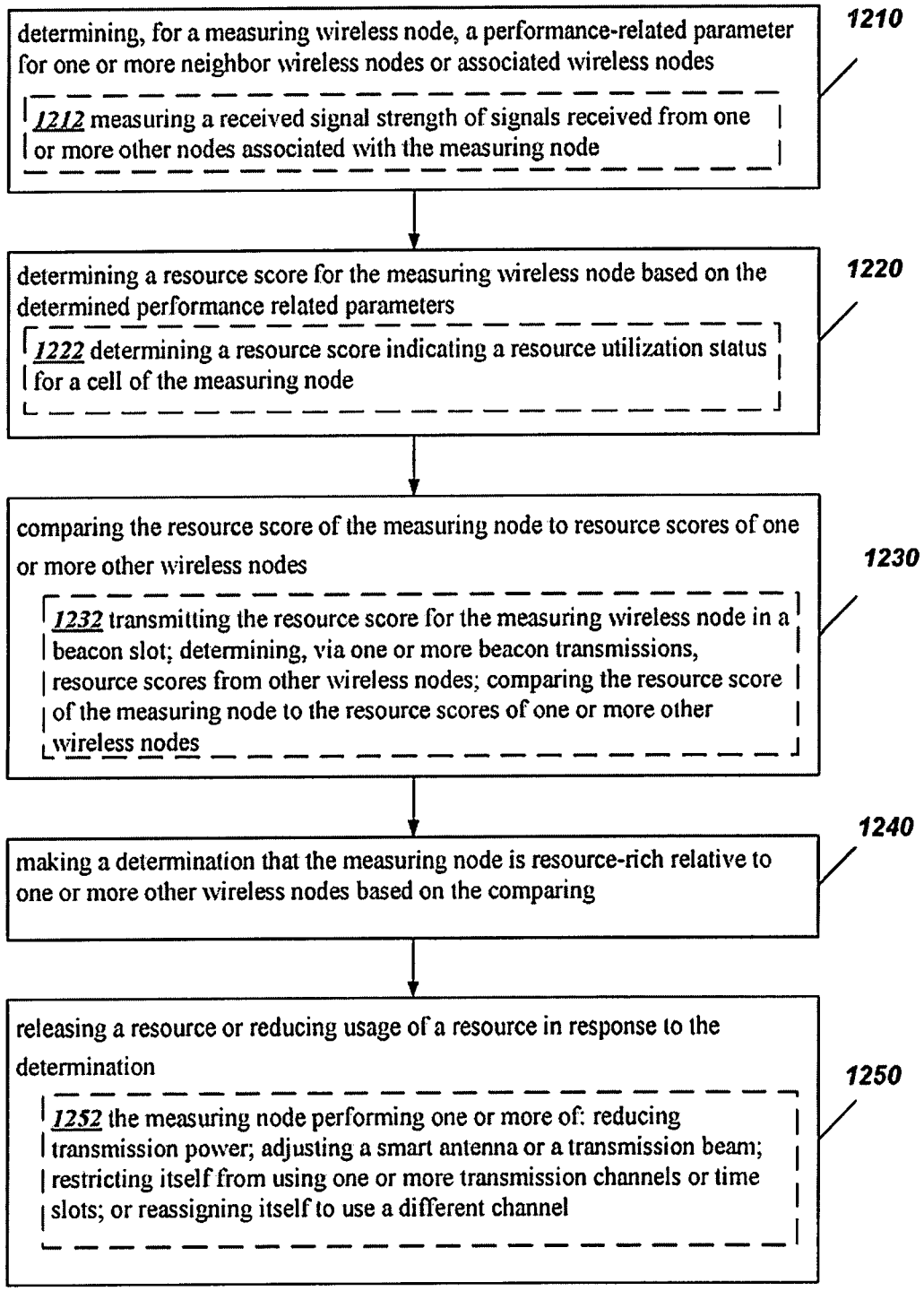
FIG. 12 is a flowchart illustrating operation of a wireless node or entity according to an example embodiment.

FIG. 12 is a flowchart 1200 illustrating operation of a wireless node or entity according to an example embodiment. At 1210, a performance-related parameter for one or more neighbor wireless nodes or associated wireless nodes may be determined for a measuring wireless node. According to an example embodiment, determining the performance-related parameter may include measuring a received signal strength of signals received from one or more other nodes associated with the measuring node (1212).

At 1220, a resource score for the measuring wireless node may be determined based on the determined performance related parameters. According to an example embodiment, determining the resource score may include determining a resource score indicating a resource utilization status for a cell of the measuring node (1222).

At 1230, the resource score of the measuring node may be compared to resource scores of one or more other wireless nodes. According to an example embodiment, the comparing may include transmitting the resource score for the measuring wireless node in a beacon slot; determining, via one or more beacon transmissions, resource scores from other wireless nodes; and comparing the resource score of the measuring node to the resource scores of one or more other wireless nodes (1232).

At 1240, a determination that the measuring node is resource-rich relative to one or more other wireless nodes may be made based on the comparing.

At 1250, a resource may be released or usage of a resource may be reduced in response to the determination. According to an example embodiment, releasing the resource may include the measuring node performing one or more of the following: reducing transmission power; adjusting a smart antenna or a transmission beam; restricting itself from using one or more transmission channels or time slots; or reassigning itself to use a different channel (1252).

Figure 13:
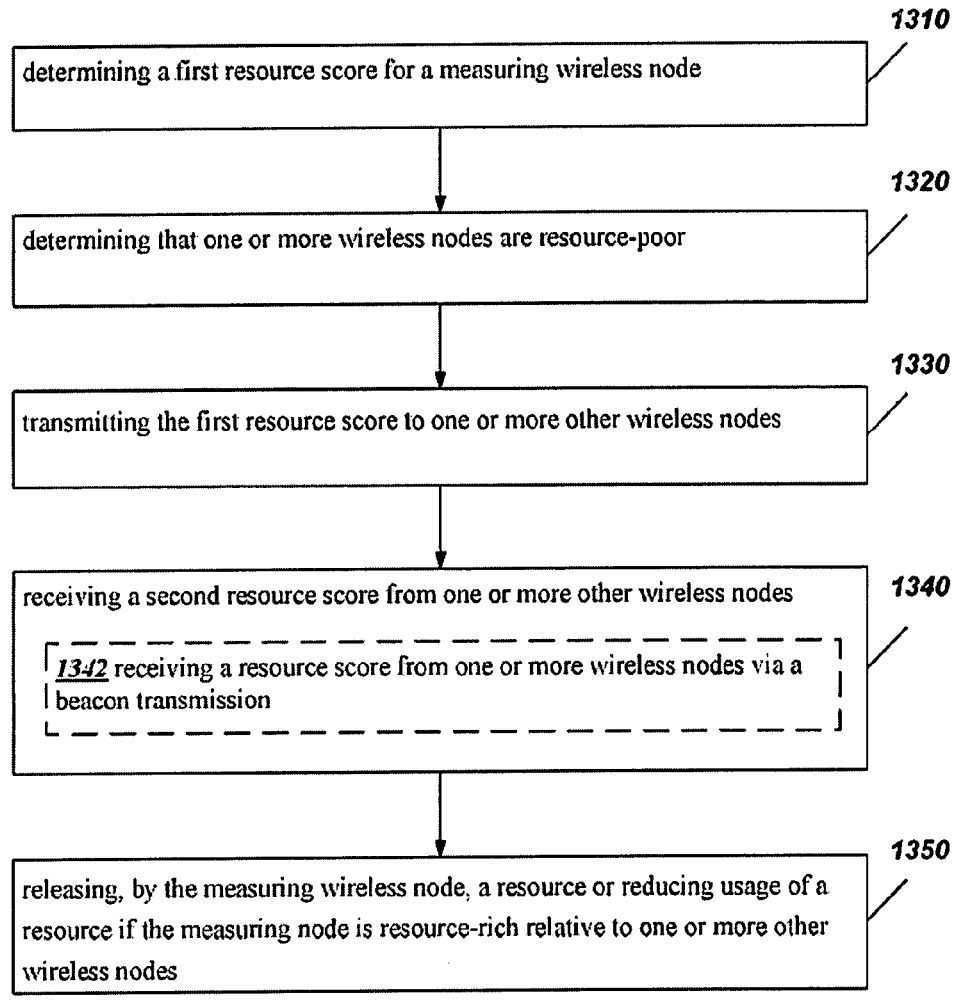
FIG. 13 is a flowchart illustrating operation of a wireless node or entity according to an example embodiment.

FIG. 13 is a flowchart 1300 illustrating operation of a wireless node or entity according to an example embodiment. At 1310, determining a first resource score for a measuring wireless node may be determined. At 1320, it may be determined that one or more wireless nodes are resource-poor.

At 1330, the first resource score may be transmitted to one or more other wireless nodes. At 1340, a second resource score may be received from one or more other wireless nodes. According to an example embodiment, receiving the second resource score from one or more other wireless nodes may include receiving the second resource score from one or more wireless nodes via a beacon transmission (1342).

At 1350, a resource may be released or usage of a resource may be reduced by the measuring node if the measuring node is resource-rich relative to one or more other wireless nodes.

Figure 14:
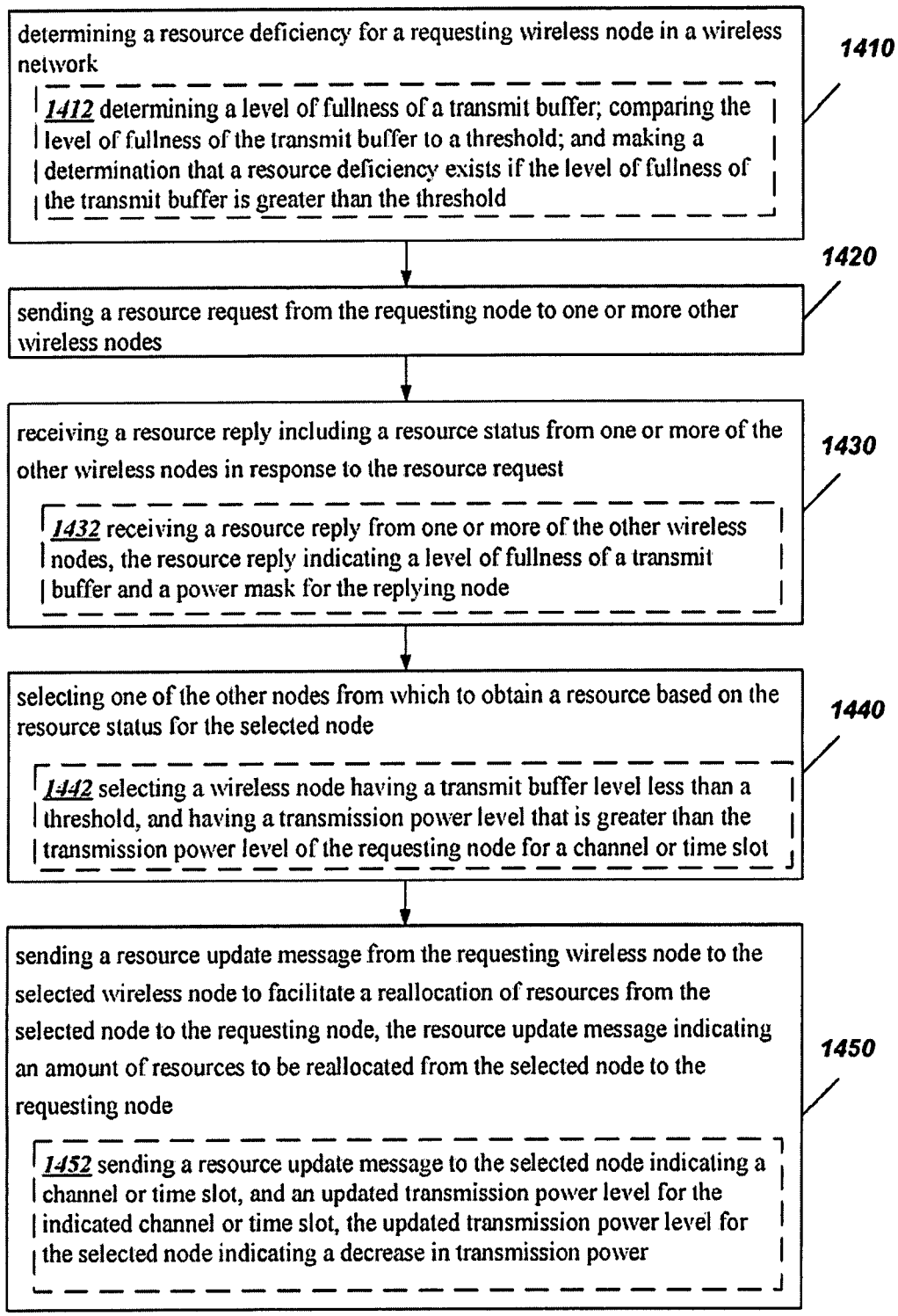
FIG. 14 is a flowchart illustrating operation of a wireless node or entity according to an example embodiment.

FIG. 14 is a flowchart 1400 illustrating operation of a wireless node or entity according to an example embodiment. At 1410, a resource deficiency for a requesting wireless node in a wireless network may be determined. According to an example embodiment, determining the resource deficiency may include determining a level of fullness of a transmit buffer; comparing the level of fullness of the transmit buffer to a threshold; and making a determination that a resource deficiency exists if the level of fullness of the transmit buffer is greater than the threshold (1412).

At 1420, a resource request may be sent from the requesting node to one or more other wireless nodes.

At 1430, a resource reply including a resource status may be received from one or more of the other wireless nodes in response to the resource request. According to an example embodiment, receiving a resource reply may include receiving a resource reply from one or more of the other wireless nodes, the resource reply indicating a level of fullness of a transmit buffer and a power mask for the replying node (1432).

According to an example embodiment, receiving a resource reply may include receiving a resource reply from one or more of the other wireless nodes, the resource reply indicating a level of fullness of a transmit buffer and a power mask for the replying node, the power mask indicating a transmission power level for one or more channels or time slots of the replying node.

At 1440, one of the other nodes from which to obtain a resource may be selected based on the resource status for the selected node. According to an example embodiment, selecting one of the other nodes may include selecting a wireless node having a transmit buffer level less than a threshold, and having a transmission power level that is greater than the transmission power level of the requesting node for a channel or time slot (1442).

According to an example embodiment, selecting one of the other nodes may include selecting a wireless node having a highest U, where U is defined as: U=a*(normal_threshold−buffer_level)+b*power_difference), the buffer_level indicates a level of fullness of a transmit buffer of the replying node, power_difference indicates the difference in transmission power levels between the replying node and the requesting node, and wherein a and b are variable weighting factors. According to an example embodiment, the buffer_level may be defined as:

buffer_level=(normal_threshold−buffer_level)/normal_threshold.

At 1450, a resource update message may be sent from the requesting wireless node to the selected wireless node to facilitate a reallocation of resources from the selected node to the requesting node, the resource update message indicating an amount of resources to be reallocated from the selected node to the requesting node.

According to an example embodiment, sending the resource update message may include sending a resource update message to the selected node indicating a channel or time slot, and an updated transmission power level for the indicated channel or time slot, the updated transmission power level for the selected node indicating a decrease in transmission power (1452). According to an example embodiment, the requesting node may increase a transmission power by an amount that the selected node decreases its transmission power.

According to an example embodiment, one or more active flows may be canceled at the requesting node.

According to an example embodiment, sending the resource update message may include sending a resource update message from the requesting wireless node to the selected wireless node indicating a new resource level to be used by the selected node or an amount of decrease in resource level for the selected node.

According to an example embodiment, the requesting node may obtain a resource that has been reallocated from the selected node to the requesting node.

According to an example embodiment, a second resource update message may be sent from the requesting wireless node to the selected wireless node indicating that previously reallocated resources are being returned to the selected node. According to an example embodiment, sending the second resource update message may include determining that a resource deficiency at the requesting node no longer exists or is decreased, releasing, at the requesting node, a resource that was previously reallocated from the selected node to the requesting node, the releasing including reducing, at the requesting node, a power transmission level by an amount that the transmission power level was previously increased, and sending a second resource update message to the selected node indicating a channel or time slot and an updated transmission power level for the channel or time slot for the selected node.

According to an example embodiment, sending the second resource update message may include sending an updated power mask indicating an updated transmission power level to be used by the selected node.

Figure 15:
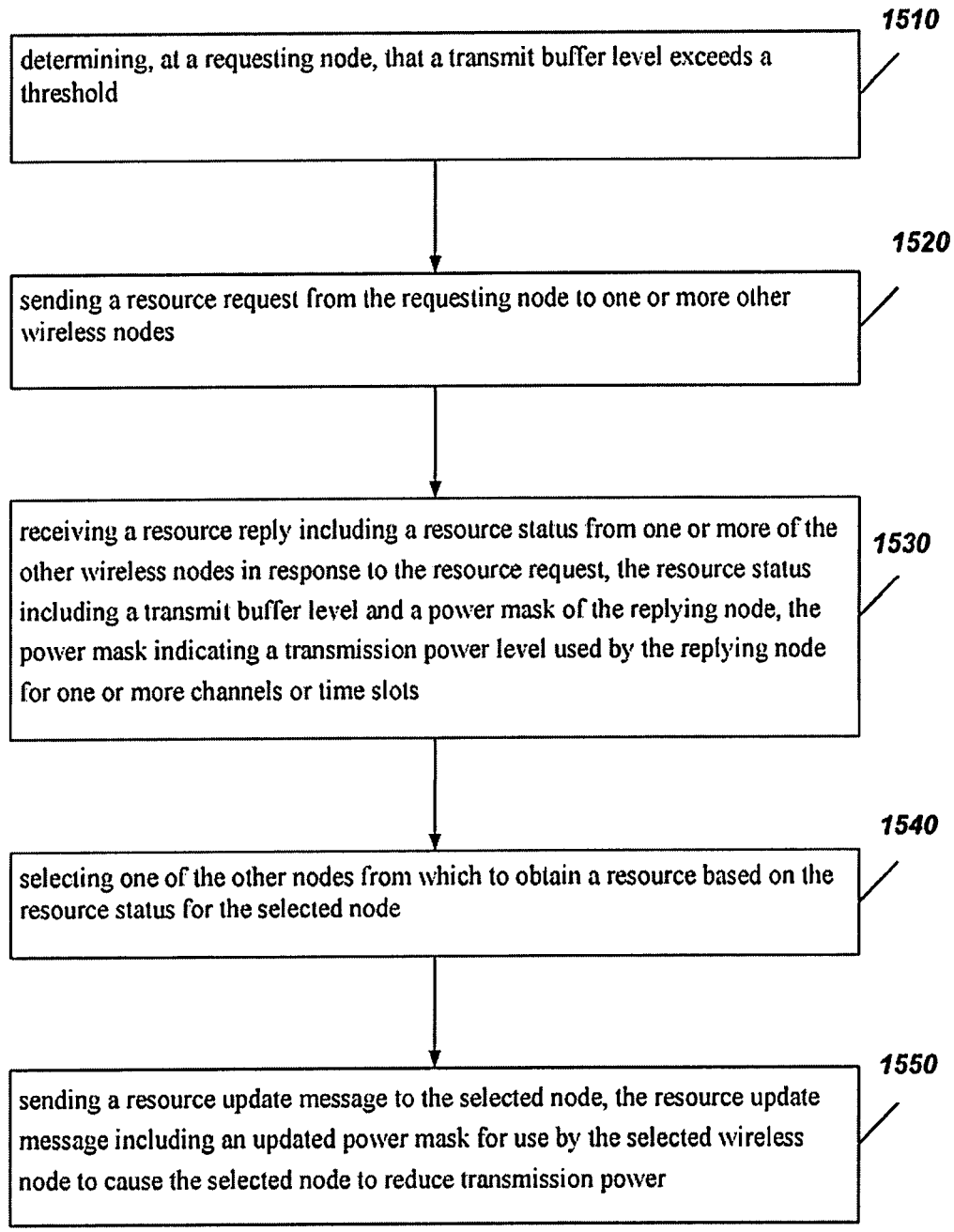
FIG. 15 is a flowchart illustrating operation of a wireless node or entity according to an example embodiment.

FIG. 15 is a flowchart 1500 illustrating operation of a wireless node or entity according to an example embodiment. At 1510, it may be determined, at a requesting node, that a transmit buffer level exceeds a threshold.

At 1520, a resource request may be sent from the requesting node to one or more other wireless nodes. At 1530, a resource reply including a resource status may be received from one or more of the other wireless nodes in response to the resource request, the resource status including a transmit buffer level and a power mask of the replying node, the power mask indicating a transmission power level used by the replying node for one or more channels or time slots.

At 1540, one of the other nodes from which to obtain a resource may be selected based on the resource status for the selected node. At 1550, a resource update message may be sent to the selected node, the resource update message including an updated power mask for use by the selected wireless node to cause the selected node to reduce transmission power.

Figure 16:
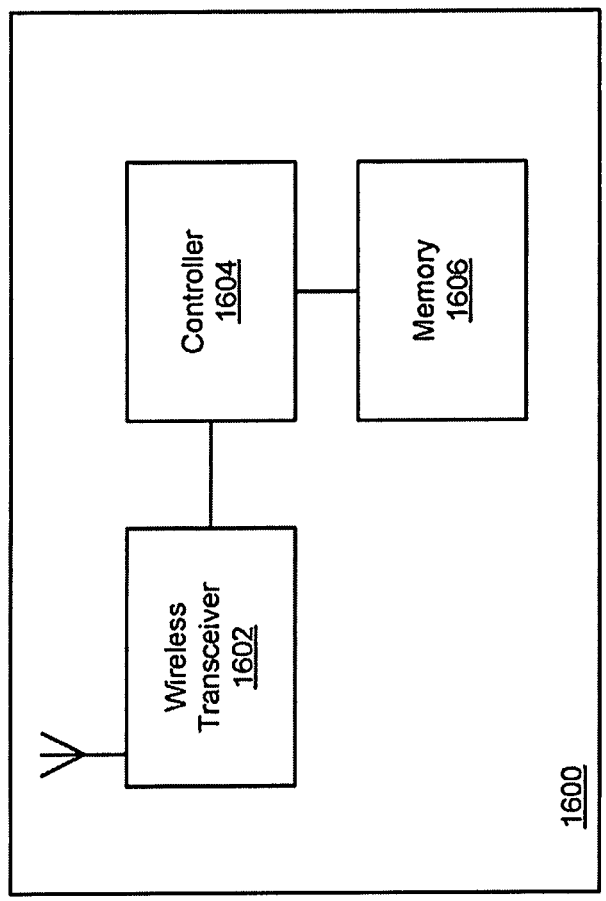
FIG. 16 is a block diagram illustrating an apparatus that may be provided in a wireless node or wireless entity according to an example embodiment.

FIG. 16 is a block diagram illustrating an apparatus 1600 that may be provided in a wireless station according to an example embodiment. The wireless station may include, for example, a wireless transceiver 1602 to transmit and receive signals, a controller 1604 to control operation of the station and execute instructions or software, and a memory 1606 to store data and/or instructions. Controller 1604 may be programmable, and capable of executing software or other instructions stored in memory or on other computer media to perform the various tasks and functions described above. In addition, a storage medium or computer readable medium may be provided that includes stored instructions, that, when executed by a controller or processor, may result in the controller (e.g., the controller 1604) performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or computer readable medium or in a propagated signal, for execution by, or to control the operation of, a data processing apparatus, e.g., a programmable processor or multiple processors, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   determining, for a measuring wireless node in a wireless network that comprises a plurality of self-managing and distributed wireless nodes, a performance-related parameter for one or more neighbor wireless nodes or associated wireless nodes;
   determining at the measuring wireless node a resource score for the measuring wireless node based on the determined performance related parameters;
   comparing at the measuring wireless node the resource score of the measuring wireless node to resource scores of one or more other wireless nodes;
   making a determination at the measuring wireless node that the measuring wireless node is resource-rich relative to one or more other wireless nodes based on the comparing; and
   releasing a resource in response to the determination, wherein the releasing comprises the measuring wireless node restricting itself from using one or more transmission channels,
   wherein the determining a performance-related parameter comprises measuring a received signal strength of signals received from one or more other wireless nodes associated with the measuring wireless node.

2. The method of claim 1 wherein the determining a resource score comprises determining a resource score indicating a resource utilization status for a cell of the measuring wireless node.

3. The method of claim 1 wherein the comparing comprises:
   transmitting the resource score for the measuring wireless node in a beacon slot;
   determining, via one or more beacon transmissions, resource scores from other wireless nodes;

comparing the resource score of the measuring wireless node to the resource scores of one or more other wireless nodes.

4. The method of claim 1 wherein the releasing a resource comprises the measuring wireless node performing one or more of the following:
reducing transmission power;
adjusting a smart antenna or a transmission beam; or
reassigning itself to use a different channel.

5. A method comprising:
determining at a measuring wireless node a first resource score for the measuring wireless node in a wireless network that comprises a plurality of self-managing and distributed wireless nodes;
determining at the measuring wireless node that one or more wireless nodes are resource-poor;
transmitting the resource score to one or more other wireless nodes;
receiving a second resource score from one or more other wireless nodes; and
releasing, by the measuring wireless node, a resource if the measuring wireless node is resource-rich relative to one or more other wireless nodes, wherein the releasing comprises the measuring wireless node restricting itself from using one or more transmission channels,
wherein the determining a first resource score comprises measuring a received signal strength of signals received from one or more other wireless nodes associated with the measuring wireless node.

6. The method of claim 5 wherein the receiving a second resource score from one or more other wireless nodes comprises receiving a second resource score from one or more wireless nodes via a beacon transmission.

7. A method comprising:
determining a resource deficiency for a requesting wireless node in a wireless network;
sending a resource request from the requesting wireless node to one or more other wireless nodes;
receiving a resource reply including a resource status from one or more of the other wireless nodes in response to the resource request;
selecting one of the other wireless nodes from which to obtain a resource based on the resource status for the selected wireless node; and
sending a resource update message from the requesting wireless node to the selected wireless node to facilitate a reallocation of resources from the selected wireless node to the requesting wireless node, the resource update message indicating an amount of resources to be reallocated from the selected wireless node to the requesting wireless node,
wherein the selecting one of the other wireless nodes comprises selecting a wireless node having a transmit buffer level less than a threshold, and having a transmission power level that is greater than the transmission power level of the requesting wireless node for a channel or time slot.

8. The method of claim 7 wherein the determining a resource deficiency comprises:
determining a level of fullness of a transmit buffer;
comparing the level of fullness of the transmit buffer to a threshold; and
making a determination that a resource deficiency exists if the level of fullness of the transmit buffer is greater than the threshold.

9. The method of claim 7 wherein the receiving a resource reply comprises receiving a resource reply from one or more of the other wireless nodes, the resource reply indicating a level of fullness of a transmit buffer and a power mask for the replying one or more wireless nodes.

10. The method of claim 7 wherein the receiving a resource reply comprises receiving a resource reply from one or more of the other wireless nodes, the resource reply indicating a level of fullness of a transmit buffer and a power mask for the replying one or more wireless nodes, the power mask indicating a transmission power level for one or more channels or time slots of the replying wireless node.

11. The method of claim 7 wherein the selecting one of the other wireless nodes comprises selecting a wireless node having a highest U, where U is defined as: $U=a*(normal\_threshold-buffer\_level)+b*power\_difference)$, the buffer_level indicates a level of fullness of a transmit buffer of the replying wireless node, power_difference indicates the difference in transmission power levels between the replying wireless node and the requesting wireless node, and wherein a and b are variable weighting factors.

12. The method of claim 11 wherein the buffer_level is defined as: $buffer\_level=(normal\_threshold-buffer\_level)/normal\_threshold$.

13. The method of claim 7 further comprising the requesting wireless node obtaining a resource that has been reallocated from the selected wireless node to the requesting wireless node.

14. The method of claim 7 wherein the sending a resource update message comprises sending a resource update message to the selected wireless node indicating a channel or time slot, and an updated transmission power level for the indicated channel or time slot, the updated transmission power level for the selected wireless node indicating a decrease in transmission power.

15. The method of claim 14 further comprising the requesting wireless node increasing a transmission power by an amount that the selected wireless node decreases its transmission power.

16. The method of claim 7 further comprising canceling one or more active flows at the requesting wireless node.

17. The method of claim 7 wherein the sending a resource update message comprises sending a resource update message from the requesting wireless node to the selected wireless node indicating a new resource level to be used by the selected wireless node or an amount of decrease in resource level for the selected wireless node.

18. The method of claim 7 and further comprising sending a second resource update message from the requesting wireless node to the selected wireless node indicating that previously reallocated resources are being returned to the selected wireless node.

19. The method of claim 18 wherein the sending a second resource update message comprises:
determining that a resource deficiency at the requesting wireless node no longer exists or is decreased;
releasing, at the requesting wireless node, a resource that was previously reallocated from the selected wireless node to the requesting wireless node, the releasing including reducing, at the requesting wireless node, a power transmission level by an amount that the transmission power level was previously increased; and
sending a second resource update message to the selected wireless node indicating a channel or time slot and an updated transmission power level for the channel or time slot for the selected wireless node.

20. The method of claim 18 wherein the sending a second resource update message comprises sending an updated power mask indicating an updated transmission power level to be used by the selected wireless node.

21. A method comprising:
    determining, at a requesting wireless node, that a transmit buffer level exceeds a threshold;
    sending a resource request from the requesting wireless node to one or more other wireless nodes;
    receiving a resource reply including a resource status from one or more of the other wireless nodes in response to the resource request, the resource status including a transmit buffer level and a power mask of the replying wireless node, the power mask indicating a transmission power level used by the replying wireless node for one or more channels or time slots;
    selecting one of the other wireless nodes from which to obtain a resource based on the resource status for the selected wireless node;
    sending a resource update message to the selected wireless node, the resource update message including an updated power mask for use by the selected wireless node to cause the selected wireless node to reduce transmission power,
    wherein the selecting one of the other wireless nodes comprises selecting a wireless node having a transmit buffer level less than a threshold, and having a transmission power level that is greater than the transmission power level of the requesting wireless node for a channel or time slot.

22. An apparatus for wireless communications, the apparatus comprising:
    a controller;
    a memory coupled to the controller; and
    a wireless transceiver coupled to the controller;
    the apparatus adapted to:
    determine a resource deficiency for a requesting wireless node in a wireless network;
    send a resource request from the requesting wireless node to one or more other wireless nodes;
    receive a resource reply including a resource status from one or more of the other wireless nodes in response to the resource request;
    select one of the other wireless nodes from which to obtain a resource based on the resource status for the selected wireless node; and
    send a resource update message from the requesting wireless node to the selected wireless node to facilitate a reallocation of resources from the selected wireless node to the requesting wireless node, the resource update message indicating an amount of resources to be reallocated from the selected wireless node to the requesting wireless node,
    wherein the selecting one of the other wireless nodes comprises selecting a wireless node having a transmit buffer level less than a threshold, and having a transmission power level that is greater than the transmission power level of the requesting wireless node for a channel or time slot.

* * * * *